US012753743B2

(12) United States Patent
Omenetto et al.

(10) Patent No.: US 12,753,743 B2
(45) Date of Patent: Oct. 6, 2026

(54) SYSTEMS AND METHODS FOR A REMOTE CONTROL ACTUATOR

(71) Applicant: Trustees of Tufts College, Medford, MA (US)

(72) Inventors: Fiorenzo G. Omenetto, Lexington, MA (US); Meng Li, Medford, MA (US)

(73) Assignee: Trustees of Tufts College, Medford, MA (US)

(*) Notice: Subject to any disclaimer, the term of this patent is extended or adjusted under 35 U.S.C. 154(b) by 1011 days.

(21) Appl. No.: 17/257,734

(22) PCT Filed: Jul. 2, 2019

(86) PCT No.: PCT/US2019/040430
§ 371 (c)(1),
(2) Date: Jan. 4, 2021

(87) PCT Pub. No.: WO2020/068243
PCT Pub. Date: Apr. 2, 2020

(65) Prior Publication Data
US 2021/0270253 A1 Sep. 2, 2021

Related U.S. Application Data

(60) Provisional application No. 62/693,358, filed on Jul. 2, 2018.

(51) Int. Cl.

| | |
|---|---|
| ***F03G 7/06*** | (2006.01) |
| ***B25J 15/00*** | (2006.01) |
| ***C08K 3/22*** | (2006.01) |
| ***C08L 89/04*** | (2006.01) |
| ***H01F 1/375*** | (2006.01) |
| ***H01H 37/00*** | (2006.01) |
| ***H01H 37/32*** | (2006.01) |
| ***H01H 37/58*** | (2006.01) |

(52) U.S. Cl.
CPC ...... *F03G 7/06146* (2021.08); *B25J 15/0028* (2013.01); *C08K 3/22* (2013.01); *C08L 89/04* (2013.01); *F03G 7/0614* (2021.08); *F03G 7/06147* (2021.08); *F03G 7/0616* (2021.08); *H01F 1/375* (2013.01); *H01H 37/58* (2013.01); *C08K 2003/2251* (2013.01); *C08K 2201/01* (2013.01); *F05C 2203/0865* (2013.01); *F05C 2251/08* (2013.01); *F05C 2251/12* (2013.01); *F05C 2253/04* (2013.01); *H01H 2037/008* (2013.01); *H01H 2037/326* (2013.01)

(58) Field of Classification Search
CPC ........... H01F 1/375; C08L 89/04; C08K 3/22; C08K 2003/2251; C08K 2201/01; H01H 57/58; H01H 2037/008; H01H 2037/326
See application file for complete search history.

(56) References Cited

U.S. PATENT DOCUMENTS

| | | | | |
|---|---|---|---|---|
| 3,512,930 | A | 5/1970 | Bottjer | |
| 5,245,012 | A | 9/1993 | Lombari | |
| 9,331,607 | B1 | 5/2016 | Yoonessi | |
| 2002/0113066 | A1 | 8/2002 | Star | |
| 2011/0089708 | A1* | 4/2011 | Mankame | B25J 15/12 294/86.4 |
| 2014/0016177 | A1 | 1/2014 | Aizenberg | |
| 2014/0035708 | A1* | 2/2014 | Athanasiou | G09B 21/004 427/550 |
| 2015/0243404 | A1* | 8/2015 | Wong | H01B 1/22 252/514 |
| 2016/0031091 | A1* | 2/2016 | Popovic | H01F 7/204 294/192 |

FOREIGN PATENT DOCUMENTS

| | | | |
|---|---|---|---|
| WO | 1997008315 A1 | | 3/1997 |
| WO | WO 2008/106928 | * | 9/2008 |
| WO | WO 2011/068951 | * | 6/2011 |
| WO | WO 2014/021954 | * | 2/2014 |
| WO | 2015114143 A1 | | 8/2015 |
| WO | WO 2015/114143 | * | 8/2015 |
| WO | WO 2017/151429 | * | 9/2017 |
| WO | WO 2019/195417 | * | 10/2019 |
| WO | 2020068243 A1 | | 4/2020 |

OTHER PUBLICATIONS

Samal et al., "Biomimetic Magnetic Silk Scaffolds", Applied Materials & Interfaces, 2015, 7, pp. 6282-6292, Mar. 3, 2015.*
Amsden JJ et al. (2010) Rapid nanoimprinting of silk fibroin films for biophotonic applications. Adv. Mater. 22:1746-1749.
Chamberland BL (1977) The chemical and physical properties of CrO2 and tetravalent chromium oxide derivatives. Crit. Rev. Solid State 7:1-31.
Coey JMD, et al.(1998) Magnetoresistance of Chromium Dioxide Powder Compacts. Phys. Rev. Lett. 80:3815-3818.
Dai B et al. (2016) Programmable artificial phototactic microswimmer. Nat. Nanotechnol. 11:1087-1092.
Fabian K, et al. (2013) Measuring the Curie temperature. Geochem. Geophys. Geosyst. 14:947-961.
Fuhrer R, et al (2013) Soft Iron/Silicon Composite Tubes for Magnetic Peristaltic Pumping. Frequency—Dependent Pressure and Volume Flow. Adv. Funct. Mater. 23:3845-3849.
(Continued)

*Primary Examiner* — C Melissa Koslow
(74) *Attorney, Agent, or Firm* — GTC Law Group PC & Affiliates

(57) ABSTRACT

The present application relates to compositions and methods of making flexible composite materials that are capable of moving, on a micro- or macro-scale, in response to an applied magnetic field and localized heat from a heat source. The present disclosure further provides systems and methods of using the flexible composite material as an actuator for performing a mode of actuation. In one embodiment, the flexible composite material forms a wireless actuator that, when irradiated with light, is capable of micro- and macro-scale motion acting through the interplay of optically absorptive elements and low-Curie temperature magnetic particles.

14 Claims, 19 Drawing Sheets

(56) References Cited

OTHER PUBLICATIONS

Gelebart AH et al. (2017) A Rewritable, Reprogrammable, Dual Light-Responsive Polymer Actuator. Angew. Chem. Int. Edit. 56:13436-13439.
Gelebart AH et al. (2017) Making waves in a photoactive polymer film. Nature 546:632-636.
Gockenbach M, et al. (2009) Newton's law of heating and the heat equation. Involve 2:419-437.
Harsanyi G (2000) Polymer films in sensor applications. A review of present uses and future possibilities. Sensor Rev. 20:98-105.
Hashimoto E, et al (1995) Development of a thermally controlled magnetization actuator (TCMA) for a micromachined motor. Electron. Comm. Jpn. 2 78:96-103.
Iamsaard S et al. (2014) Conversion of light into macroscopic helical motion. Nat. Chem. 6:229-235.
International Searching Authority. International Search Report and Written Opinion for application PCT/US2019/040430. Mailed on Mar. 9, 2020. 10 pages.
Leng J, et al (2010) Study on the activation of styrene-based shape memory polymer by medium-infrared laser light. Appl. Phys. Lett. 96:111905.
Liu Y, et al. (2017) Sequential self-folding of polymer sheets. Sci. Adv. 3:e1602417.
Lu, X., et al. Tunable Photocontrolled Motions Using Stored Strain Energy in Malleable Azobenzene Liquid Crystalline Polymer Actuators. Adv. Mater. 29, 1606467 (2017).
Lucas et al., "The silk fibroins." Advances in protein chemistry 13 (1958): 107-242.
Lv J-A et al. (2016) Photocontrol of fluid slugs in liquid crystal polymer microactuators. Nature 537:179-184.
Matsumoto A et al. (2006) Mechanisms of silk fibroin sol-gel transitions. J. Phys. Chem. B 110:21630-21638.
Mizutani Y, et al. (2008) Optically Three-Dimensional Control of Magnetic Levitation Using Temperature-Sensitive Ferrite. Jpn. J. Appl. Phys. 47:3461-3465.
Mu J et al. (2015) Origami-inspired active graphene-based paper for programmable instant self-folding walking devices. Sci. Adv. 1:e1500533.
Omenetto FG, et al. (2008) A new route for silk. Nat. Photonics 2:641-643.
Onodera S, et al. (1996) Materials for Magnetic-Tape Media. MRS Bull. 21:35-41.
Palagi S et al. (2016) Structured light enables biomimetic swimming and versatile locomotion of photoresponsive soft microrobots. Nat. Mater. 15:647-653.
Partlow BP et al. (2014) Highly tunable elastomeric silk biomaterials. Adv. Funct. Mater. 24:4615-4624.
Rockwood DN et al. (2011) Materials fabrication from Bombyx mori silk fibroin. Nat. Protoc. 6:1612-1631.
Seethapathy S, et al. (2012) Applications of polydimethylsiloxane in analytical chemistry: a review. Anal. Chim. Acta 750:48-62.
Tai Y, et al. (2016) Light-Activated Rapid-Response Polyvinylidene-Fluoride-Based Flexible Films. Adv. Mater. 28:4665-4670.
Tao H, et al. (2012) Silk materials—a road to sustainable high technology. Adv. Mater. 24:2824-2837.
Toffanin S et al. (2012) Low-threshold blue lasing from silk fibroin thin films. Appl. Phys. Lett. 101:91110.
Van Thourhout D, et al. (2010) Optomechanical device actuation through the optical gradient force. Nat. Photonics 4:211-217.
Vatankhah-Varnosfaderani M et al. (2017) Mimicking biological stress-strain behaviour with synthetic elastomers. Nature 549:497-501.
Wang J et al. (2017) High-Performance Photothermal Conversion of Narrow-Bandgap Ti2 O3 Nanoparticles. Adv. Mater. 29.
Wang L et al. (2015) A Bioinspired Swimming and Walking Hydrogel Driven by Light-Controlled Local Density. Adv. Mater. 2:1500084.
Wang M, et al. (2016) A plant tendril mimic soft actuator with phototunable bending and chiral twisting motion modes. Nat. Commun. 7:13981.
Wang T, et al. (2017) Maximizing the performance of photothermal actuators by combining smart materials with supplementary advantages. Sci. Adv. 3:e1602697.
Wani OM, et al. (2017) A light-driven artificial flytrap. Nat. Commun. 8:15546.
Xu L et al. (2016) High-Q silk fibroin whispering gallery microresonator. Opt. Express 24:20825-20830.
Xu X et al. (2015) Self-Sensing, Ultralight, and Conductive 3D Graphene/Iron Oxide Aerogel Elastomer Deformable in a Magnetic Field. ACS nano 9:3969-3977.
Yang H et al. (2017) 3D Printed Photoresponsive Devices Based on Shape Memory Composites. Adv. Mater. 29:1701627.
Yoshizawa T, et al. (2001) A walking machine driven by a light beam. Proc. SPIE 4564:229-237.
Zhang X et al. (2014) Photoactuators and motors based on carbon nanotubes with selective chirality distributions. Nat. Commun. 5:2983.
PCT/US2019/040430 , "International Application Serial No. PCT/US2019/040430, International Preliminary Report on Patentability mailed Jan. 5, 2021", Tufts University, 7 pages.

* cited by examiner

SYSTEMS AND METHODS FOR A REMOTE CONTROL ACTUATOR

CROSS-REFERENCE TO RELATED APPLICATIONS

This patent application claims the benefit of priority to U.S. provisional Patent Application Ser. No. 62/693,358 filed Jul. 2, 2018, the entire contents of which are hereby incorporated by reference herein.

STATEMENT REGARDING FEDERALLY SPONSORED RESEARCH

This invention was made with government support under grant N00014-16-1-2437 awarded by the United States Navy. The government has certain rights in the invention.

BACKGROUND

In general, actuators are components used to move a mechanical system or perform shape morphing in response to certain stimuli. Among various mechanisms to induce mechanical deformation, light has distinguishing advantages of wireless control, and the capability of high-resolution and localized stimulation. Current photomechanical systems are mainly based on liquid crystal, optical gradient force, shape memory polymers or inequivalent expansion of gradient materials. The actuating direction mostly depends on incident light direction or material gradient direction. Most optomechanical devices can perform simple movement such as bending, twisting or expansion with simple light modulation, and achieve complex movement like folding, walking, swimming or waving only with complex light patterning or structured design. There are many occasions, however, where these modulations cannot be satisfied, and the versatility is limited by the specific design.

Ferro-/ferrimagnetic materials become paramagnetic above their Curie temperature, losing their spontaneous magnetization. However, most magnetic materials used in magnetic actuators have high Curie temperature: 857 K for magnetite $Fe_3O_4$, 1043 K for Iron, 1394 K for Cobalt and 631 K for Nickel. Thus, it is difficult to significantly change their magnetic properties by temperature change near room temperature. Temperature-sensitive ferrites (TSF) have been explored as actuators, and microrobots based on the large variation of magnetic properties by temperature. They are alloys made mainly of iron and nickel, which can have Curie temperature as low as 310 K. However, they are constrained by brittle and bulky material formats lacking the mechanical flexibility that is generally required for use in actuation and soft-robotics.

SUMMARY OF THE DISCLOSURE

Described herein are compositions and methods of making flexible composite materials that are capable of moving, on a micro- or macro-scale, in response to an applied magnetic field and localized heat from a heat source. The present disclosure further provides systems and methods of using the flexible composite material as an actuator for performing a mode of actuation. In one embodiment, the flexible composite material forms a wireless actuator that, when irradiated with light, is capable of micro- and macro-scale motion acting through the interplay of optically absorptive elements and low-Curie temperature magnetic particles.

In some aspects, the present disclosure provides a temperature-responsive flexible magnetic composite that comprises at least one polymer and a plurality of magnetic particles dispersed throughout at least a portion of the temperature-responsive flexible magnetic composite. The at least one polymer may comprise a biopolymer, such as silk fibroin, or an elastomer, such as poly(dimethylsiloxane). In some aspects, the plurality of magnetic particles comprise a Curie temperature above which the plurality of magnetic particles becomes paramagnetic and loses spontaneous magnetization. For example, the magnetic particles may comprise a Curie temperature of less than 300° C.

In some aspects, the magnetic particles comprise chromium dioxide ($CrO_2$).

In some aspects, the magnetic particles are dispersed uniformly throughout at least a portion of the composite material.

In some aspects, the magnetic particle is dispersed at a gradient concentration, where the concentration of magnetic particle is greater at a first location in the composite material when compared to a second location.

In some aspects, the polymer and the plurality of magnetic particles are formed into a material selected from a film, a sponge, a monolith, a hydrogel, or combinations thereof. In some aspects, the hydrogel material comprises crosslinked silk fibroin and the plurality of magnetic particles dispersed throughout the crosslinked silk fibroin.

In some aspects, the flexible composite material comprises a weight ratio of magnetic particle to polymer between 1:1 and 5:1.

In some aspects, the composite material comprises an additive. The additive may include a light-absorbing additive. The additive may increase the thermal conductivity of the composite material.

In some aspects, the composite material is formed into a pattern. The pattern may be an actuator. In some aspects, at least a portion of the actuator is configured to move in response to heating the composite material above the Curie temperature and/or a magnetic field.

In some aspects, the composite material is formed into a pattern comprising the shape of a wheel. The wheel may be configured to rotate in response to a portion of the wheel reaching the Curie temperature and/or a magnetic field.

In other aspects, the present disclosure provides a thermal-sensitive actuator system. The thermal-sensitive actuator system may comprise an actuator, a magnet, and a heating system. In some embodiments, the actuator is composed of a composite material, the composite material comprising at least one polymer and a plurality of magnetic particles dispersed throughout at least a portion of the composite material, wherein the plurality of magnetic particles has a Curie temperature above which the plurality of magnetic particles becomes paramagnetic and loses spontaneous magnetization. In some aspects, the magnet is configured to apply a magnetic field over at least a portion of the actuator, and the heating system is configured to apply heat at least a portion of the actuator.

In some aspects, the heating system is configured to apply heat to at least a portion of the actuator for a duration sufficient such that the actuator moves in response to the magnetic field and at least a portion of the magnetic particles in the actuator reaching the Curie temperature.

In some aspects, the actuator is in the shape of a wheel, and the heating system is configured to apply heat to at least a portion of the wheel such that the wheel rotates in response to the magnetic field and at least a portion of the magnetic particles reaching the Curie temperature.

In some aspects, the actuator is in the shape of a grapple having one or more opposing lever configured to pinch and retract, and the heating system is configured to apply heat to at least a portion of the grapple such that the grapple pinches and retracts in response to the magnetic field and at least a portion of the magnetic particles reaching the Curie temperature.

In some aspects, the magnet comprises a permanent magnet or an electromagnet.

In some aspects, the heating system is a light source configured to irradiate the portion of the actuator.

In some aspects, the light source comprises a laser.

In some aspects, the present disclosure provides a method of using a flexible composite material as an actuator. The method includes heating a composite material to a temperature sufficient to elevate the temperature of at least a portion of the composite material above a Curie temperature of one or more magnetic particles in the composite material. The composite material may comprise at least one polymer and the one or more magnetic particles dispersed throughout at least a portion of the composite material. In some forms, the polymer is silk fibroin or poly(dimethylsiloxane), and the plurality of magnetic particles comprises a Curie temperature above which the plurality of magnetic particles becomes paramagnetic and loses or eliminates spontaneous magnetization.

In some aspects, the heating is remote.

In some aspects, the heating includes illuminating the composite material with light in an amount sufficient to raise the temperature above the Curie temperature of the one or more magnetic particles in the composite material.

In one aspect, the present disclosure provides a method of making a flexible magnetic composite material. The method includes casting a layer of a material comprising at least one polymer and a plurality of magnetic particles, and forming the material into an actuator, In some forms, the polymer comprises silk fibroin or poly(dimethylsiloxane), and the plurality of magnetic particles comprise a Curie temperature above which the plurality of magnetic particles becomes paramagnetic and loses spontaneous magnetization.

BRIEF DESCRIPTION OF THE DRAWINGS

The foregoing and other objects, aspects, features, and advantages of the present disclosure will become more apparent and better understood by referring to the following description taken in conjunction with the accompanying figures in which:

FIG. 1 at panel A is an image of a 50% magnetic silk fibroin (SF) film from top and side views of a bending film. FIG. 1 at panel B is SEM image of a S-side (top) and the C-side (bottom) surface of a 50% magnetic SF film. FIG. 1 at panel C is a SEM image of the cross-section, the inset image is with pseudo color to emphasize the $CrO_2$ vertical gradient of a 50% magnetic SF film. FIG. 1 at panel D is a flexible 20% magnetic PDMS slab with 1.5 mm thickness. FIG. 1 at panel E are different patterns that are laser-cut from magnetic PDMS membrane of 100 μm thickness. FIG. 1 at panel F is SEM image of the cross-section of a magnetic PDMS sheet, the inset image is with pseudo color to emphasize the $CrO_2$ vertical gradient. FIG. 1 at panel G is a 50% magnetic SF sponge, inset shows the light mass sponge placed on top of a plant leaf. FIG. 1 at panel H is a 200% magnetic SF block by sol-gel transformation. FIG. 1 at panel I is a 50% magnetic SF hydrogel made in a glass vial and another piece is pressed by fingers. FIG. 1 at panel J is a direct manipulation of different composite forms with a permanent magnet. FIG. 1 at panel K is a schematic illustration of the actuation of a composite cantilever by photothermal demagnetization.

FIG. 2 at panel A is an illustration of average stabilized temperature raises of magnetic SF film strips (2 mm×8 mm) with different loading percentages (25% $CrO_2$:SF, 50% $CrO_2$:SF, 75% $CrO_2$:SF, 100% $CrO_2$:SF) and 50% magnetic PDMS strip under different laser powers. The thermal camera image is for 50% magnetic PDMS sample under 120 mW illumination. The inset graph is temperature rise for different loading percentages of magnetic SF film under 145 mW laser power. FIG. 2 at panel B is an illustration of heating and cooling curves of a 50% magnetic SF film strip under 186 mW laser illumination. Inset bar graph is experimental (thick bars) and calculated (thin bars) $\tau$ values for three 50% magnetic SF and three 50% magnetic PDMS strips with laser power 37 mW. FIG. 2 at panel C is an illustration of hysteretic magnetization of pretreated $CrO_2$ powder at 300 K and 350 K. Inset is a close look of the curve at 300 K around zero magnetic field. FIG. 2 at panel D is an illustration of magnetization of pretreated $CrO_2$ powder in the temperature range from 200 K to 400 K (red curve with circle mark) and the first derivative of M (T) curve (thin curve). FIG. 2 at panel E is an illustration of the maximum displacement of the tip of a 50% magnetic PDMS strip (2 mm×8 mm×0.1 mm) under photothermal effect. Laser illuminates on C-side and P-side.

FIG. 3 at panel A is an illustration of snapshots of the actuation process under 89 mW/160 mW laser illumination and 30 mT external magnetic field. The white arrow indicates the light incidents on C-side. FIG. 3 at panel B is an illustration of a sample tip displacement as a function of time under different laser power with C-side illumination. The maximum temperature is marked for each curve. The inset shows maximum displacement for C-side and P-side illumination. In the former case, after reaching vertical alignment (D=4.46 mm), the displacement continues to increase to 5.38 mm+0.11 mm because of the thermal expansion. FIG. 3 at panel C is an illustration of cyclic responses under 100 mW laser power at 50% cycle of a period of 10 s for ~300 times.

FIG. 4 at panel A is an illustration of a schematic of the working principles of the actuator system. FIG. 4 at panel B is an illustration of snapshots of the lifting and releasing progress of a cube made of sponge. FIG. 4 at panel C is an illustration of a "flower" shaped magnetic PDMS sheet locally actuated by light and the co-existence of heliotropism (arrow labeled "1") and contra-heliotropism (arrow labeled "2"). The white arrow indicates the incident light direction. The dashed line pictures the edge of the permanent magnet. FIG. 4 at panel D is an illustration of the schematic diagram and photographic pictures of a Curie engine (outer diameter 3 cm) rotates with localized laser illumination (dashed circle) and a permanent magnet (5 cm long and 2.5 cm wide). The arrows in schematic diagram indicate the magnetic force direction and relative amplitude on the rotor.

FIG. 13 at panel A is an image showing thermal bending of 50% magnetic SF strips (2 mm Q 8 mm). FIG. 13 at panel B is an image showing 50% magnetic PDMS strip (2 mm Q 15 mm) in an oven. The displacement of the cantilever tip is 2.9 mm towards the C-side at 417 K for SF composite and 3.77 mm for PDMS composite at 408 K.

FIG. 15 at panel A is a schematic illustration and FIG. 15 at panel B is an image of an experimental set-up. An assisting magnet is placed above to help levitate the magnet. The levitated magnet is placed in between two pyrolytic graphite sheets. A 50% magnetic sponge is pressed to a thin sheet and placed above the top graphite sheet. The distance between the assisting magnet and the levitated magnet is carefully adjusted to make the small magnet levitate. When sunlight is focused on the magnetic sponge and heat it up, the attractive magnetic force between the sponge and the levitated magnet is decreased. A vertical movement of the levitated magnet is observed.

FIG. 18 at panel A shows the thermal relaxation time $\tau_{up}$ at varying power levels. FIG. 18 at panel B shows the thermal relaxation time $\tau_{down}$ for cooling down at varying power levels. FIG. 18 at panel C shows the thermal relaxation time $\tau_{up}$ at varying flexible composite material thicknesses. FIG. 18 at panel C shows the thermal relaxation time $\tau_{down}$ for cooling down at varying flexible composite material thicknesses in accordance with some aspects of the present disclosure.

FIG. 19 at panel A shows the displacement over length ratio as a function of time. FIG. 19 at panel B shows the displacement over length ratio as a function of light power. FIG. 19 at panel C shows the displacement over length ratio as a function of time during a repeatability test where light is cycled on and off for 20 s/20 s with an illumination power of 680 mW in accordance with some aspects of the present disclosure.

DETAILED DESCRIPTION

Figure 1:
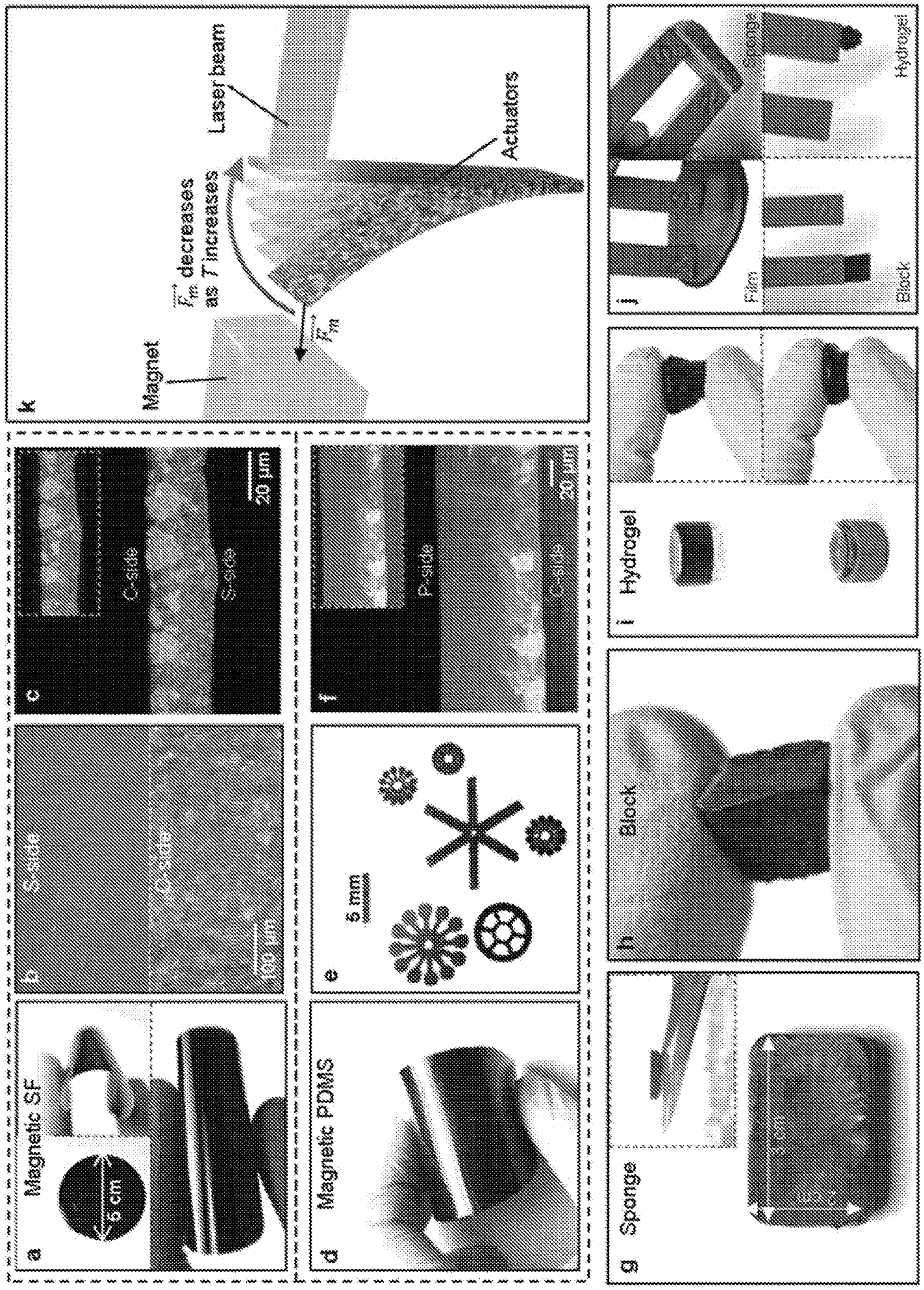
FIG. 1 shows multiple non-limiting examples of flexible composite material formats in accordance with some aspects of the present disclosure.

Described herein are compositions and methods of making flexible composite materials that are capable of moving, on a micro- or macro-scale, in response to an external stimuli, such as an applied magnetic field and localized heat from a heat source. The present disclosure further provides systems and methods of using the flexible composite material as an actuator for performing a mode of actuation. In one embodiment, the flexible composite material forms a wireless actuator that, when irradiated with light, is capable of micro- and macro-scale motion acting through the interplay of optically absorptive elements and low-Curie temperature magnetic particles.

In some embodiments, the flexible composite materials are be configured into various formats that include, but are not limited to, films, hydrogels, sponges, and monoliths (e.g. blocks). Under the influence of an applied magnetic field, these different forms can be selectively actuated at a desired location in the flexible composite material using localized heat. The utility of the flexible composite material is further compounded by forming or manufacturing the flexible composite material into a large library of shapes and/or complex geometries that can be used to enact various modes of actuation.

For example, the flexible composite materials may be formed into a particular shape and/or format that is capable of performing a mode of actuation that includes, but is not limited to linear motion, rotary motion, oscillatory motion, and reciprocating motion. Non-limiting example modes of actuation of the flexible composite material(s) include translating, rotating, bending, twisting, gripping and releasing, heliotactic motion, light-driven propulsion, folding, walking, swimming, and waving.

The flexible composite materials may be formed into an actuator and used in a variety of systems and for various applications. Exemplary applications for the actuators described herein include, but are not limited to light-controlled mechanics, self-assembly of components, heliotactic motion (e.g., sun or natural light tracking), reconfigurable surfaces, multimodal locomotion, soft robotics, and the like.

The flexible composite materials described herein overcome several drawbacks of conventional optomechanical actuators. For example, prior to the present disclosure, light-based actuators were often constrained by actuation at a particular irradiation wavelength. The flexible composite materials of the present disclosure may advantageously perform a mode of actuation that is independent of the irradiation wavelength. Conventional actuators based on material gradients, inequivalent mechanics, or specific pattern design are often constrained or limited by the direction of incident light and the orientation of the actuator. Unlike these conventional systems, the actuators of the present disclosure may perform movement or a mode of actuation that is independent of the direction of incident light and orientation of the flexible composite material.

Flexible Composite Materials:

In one embodiment, the flexible composite material comprises a polymer and magnetic particles dispersed throughout at least a portion of the polymer. The magnetic particles may comprise materials or elements, such as ferro-/ferri-magnetic materials, that become paramagnetic above their Curie temperature, losing their spontaneous magnetization. The magnetic particle may be directly incorporated within the polymer during fabrication of the flexible composite material. This may be done by mixing in the magnetic particle as a powder. In some embodiments, the fabrication process is controlled to yield flexible composite materials with uniformly distributed magnetic particles, randomly distributed magnetic particles, and magnetic particles distributed at a gradient concentration in the composite material.

The magnetic particles may have an average particle size on the order of nanometers and micrometers. In one embodiment, the magnetic particles are pretreated during fabrication to generate a reduced barrier surface layer, which may be done using sodium bisulfate. Pretreating the magnetic particles advantageously prevents oxidation reactions with water and organic solvents allowing the magnetic particle to be directly mixed with the host polymer material without introducing any visible aggregation. Suitable magnetic particles may comprise materials having low Curie temperatures, such as chromium dioxide. Pure and unmodified $CrO_2$ has a considerably low Curie temperature of 391 K (118° C.), allowing the opportunity to achieve large changes in magnetization with relatively small changes in temperature over a convenient temperature range. Chromium dioxide is easily incorporated into the polymer host material and yields flexible, elastomeric, mechanically robust, durable materials. Advantageously, chromium dioxide is an efficient light absorber and assists in increasing the thermal conductivity of the flexible composite material.

Other suitable magnetic particles may include ferromagnetic materials and ferrimagnetic materials that become demagnetized at or above their Curie temperature. Non-limiting examples include, but are not limited to iron, cobalt, nickel, gadolinium, dysprosium, manganese bismuthide, manganese antimonide, chromium (IV) oxide, manganese arsenide, europium oxide, iron (III) oxide, iron (II, III) oxide, $NiO—Fe_2O_3$, $CuO—Fe_2O_3$, $MgO—Fe_2O_3$, $MnO—Fe_2O_3$, yttrium iron garnet, neodymium magnets, alnico, samarium-cobalt magnets, strontium ferrite, and the like. In some aspects, the magnetic particle has a Curie temperature that is less than 300° C., or less than 290° C., less than 280° C., less than 270° C., less than 260° C., less than 250° C., less than 240° C., less than 230° C., less than 220° C., less than 210° C., less than 200° C., less than 190° C., less than 180° C., less than 170° C., less than 160° C., less than 150° C., less than 140° C., less than 130° C., less than 120° C., less than 110° C., or less than 100° C. In one aspect, the magnetic particle may comprise a bio-compatible material.

In some embodiments, the polymer in the flexible composite material may comprise a biopolymer, an elastomer, and mixtures thereof. Advantageously, biopolymers and elastomers may be used as the magnetic particle host material because of their polymorphic nature along with their flexibility and high failure strain. The former trait allows diverse end material formats, adjustable mechanical properties and programmable functions through directed assembly, while the latter allows for longer actuator lifetime and good reproducibility.

In some embodiments, suitable biopolymers for the flexible composite material include polypeptides, fragments or variants thereof. In some embodiments, useful polypeptides include, for example, actins, collagens, catenins, claudins, coilins, elastins, elaunins, extensins, fibrillins, fibroins, keratins, lamins, laminins, silks, structural proteins, tublins, zein proteins and combinations thereof.

One example of a suitable biopolymer for the flexible composite material includes silk fibroin (SF). Silk fibroin offers several advantages for the flexible composite material, for example, silk fibroin is a versatile biocompatible, multiformable, biodegradable biopolymer with excellent optical properties that has been explored for technological and biomedical applications.

As used herein, the term "silk fibroin" refers to silk fibroin protein whether produced by silkworm, spider, or other insect, or otherwise generated (Lucas et al., Adv. Protein Chem., 13:107-242 (1958)). Any type of silk fibroin can be used in different embodiments described herein. Silk fibroin produced by silkworms, such as *Bombyx mori*, is the most common and represents an earth-friendly, renewable resource. For instance, silk fibroin used in a silk film may be attained by extracting sericin from the cocoons of *B. mori*. Organic silkworm cocoons are also commercially available. There are many different silks, however, including spider silk (e.g., obtained from Nephila clavipes), transgenic silks, genetically engineered silks, such as silks from bacteria, yeast, mammalian cells, transgenic animals, or transgenic plants, and variants thereof, that can be used. See, e.g., WO 97/08315 and U.S. Pat. No. 5,245,012, each of which is incorporated herein as reference in its entirety.

In some embodiments, silk fibroin solution can be prepared by any conventional method known to one skilled in the art. In some embodiments, a silk solution is an aqueous silk solution. In some embodiments, silk polypeptide compositions utilized in accordance with the present invention are substantially free of sericins (e.g., contain no detectable sericin or contain sericin at a level that one of ordinary skill in the pertinent art will consider negligible for a particular use).

For example, *B. mori* cocoons are boiled for about 30 minutes in an aqueous solution. In some embodiments, the aqueous solution is about 0.02M $Na_2CO_3$. In some embodiments, boiling (degumming) time is in a range of about 5 minutes to about 120 minutes. In some embodiments, boiling (degumming) temperature is in a range of about 30° C. to about 120° C. In some embodiments, boiling (degumming) may occur under pressure. For example, suitable pressures under which protein fragments can be produced may range between about 10 to 40 psi.

The cocoons may be rinsed, for example, with water to extract the sericin proteins and the extracted silk is dissolved in an aqueous salt solution. Exemplary salts useful for this purpose include lithium bromide, lithium thiocyanate, calcium nitrate or other chemicals capable of solubilizing silk. Preferably, in some embodiments, the extracted silk is dissolved in about 9-12 M LiBr solution. The salt is consequently removed using, for example, dialysis.

In some embodiments, the flexible composite material is prepared and/or manufactured from a silk fibroin solution having about 0.5% to about 30% (by weight or volume) silk fibroin (e.g., about 0.5 wt % silk fibroin, about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt % about, 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, or about 30 wt % silk fibroin).

One example of a suitable elastomer includes polydimethylsiloxane (PDMS). PDMS is advantageous because it may be stretched or deformed and return to its original state without significant deformation. Additionally, PDMS is a widely used transparent elastomer used in fields such as micromechanics, prototyping, analytical chemistry, among others.

Polymers suitable for use in the flexible composite material may include macromolecules composed of repeating structural units connected by covalent chemical bonds or the polymerization product of one or more monomers, often characterized by a high molecular weight. Suitable polymers may include homopolymers, or polymers consisting essentially of a single repeating monomer subunit. The term polymer also includes copolymers, or polymers consisting essentially of two or more monomer subunits, such as random, block, alternating, segmented, grafted, tapered and other copolymers. Useful polymers include organic polymers or inorganic polymers that may be in amorphous, semi-amorphous, crystalline or partially crystalline states. Crosslinked polymers having linked monomer chains are particularly useful for some applications. Polymers useable in the methods, devices and composites include, but are not limited to, plastics, elastomers, thermoplastic elastomers, elastoplastics, thermoplastics and acrylates. Exemplary polymers include, but are not limited to, acetal polymers, biodegradable polymers, cellulosic polymers, fluoropolymers, nylons, polyacrylonitrile polymers, polyamide-imide polymers, polyimides, polyarylates, polybenzimidazole, polybutylene, polycarbonate, polyesters, polyetherimide, polyethylene, polyethylene copolymers and modified polyethylenes, polyketones, poly(methyl methacrylate), polymethylpentene, polyphenylene oxides and polyphenylene sulfides, polyphthalamide, polypropylene, polyurethanes, styrenic resins, sulfone-based resins, vinyl-based resins, rubber (including natural rubber, styrene-butadiene, polybutadiene, neoprene, ethylene-propylene, butyl, nitrile, silicones), acrylic, nylon, polycarbonate, polyester, polyethylene, polypropylene, polystyrene, polyvinyl chloride, polyolefin, or any combinations of these.

Elastomers suitable for use in the flexible composite material may include a polymeric material which can be stretched or deformed and returned to its original shape without substantial permanent deformation. Elastomers commonly undergo substantially elastic deformations. Useful elastomers include those comprising polymers, copolymers, composite materials or mixtures of polymers and copolymers. Useful elastomers include, but are not limited to, thermoplastic elastomers, styrenic materials, olefinic materials, polyolefin, polyurethane thermoplastic elastomers, polyamides, synthetic rubbers, PDMS, polybutadiene, polyisobutylene, poly(styrene-butadiene-styrene), polyurethanes, polychloroprene, silicones, and the like. Exemplary elastomers include, but are not limited to silicon containing polymers such as polysiloxanes including poly(dimethyl siloxane) (i.e. PDMS and h-PDMS), poly(methyl siloxane), partially alkylated poly(methyl siloxane), poly(alkyl methyl siloxane) and poly(phenyl methyl siloxane), silicon modified elastomers, thermoplastic elastomers, styrenic materials, olefinic materials, polyolefin, polyurethane thermoplastic elastomers, polyamides, synthetic rubbers, polyisobutylene, poly(styrene-butadiene-styrene), polyurethanes, polychloroprene, silicones, and the like. In an embodiment, a polymer is an elastomer.

In some embodiments, the provided flexible composite material includes an additive, dopant (e.g., magnetic particle), and/or functional moiety at a total amount from about 0.01 wt % to about 200 wt % relative to the total amount of polymer by weight in the flexible composite material (e.g., about 0.5 wt % dopant, about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt % about, 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, or about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, about 90 wt %, about 95 wt %, about 100 wt %, about 110 wt %, about 120 wt %, about 130 wt %, about 140 wt %, about 150 wt %, about 160 wt %, about 170 wt %, about 180 wt %, about 190 wt %, or about 200 wt % relative to the total amount of polymer by weight in the flexible composite material.

In some embodiments, the provided flexible composite material includes an additive, dopant (e.g., magnetic particle), and/or functional moiety at a weight ratio relative to the polymer (i.e., a magnetic particle:silk ratio) of about 1000:1, about 900:1, about 800:1, about 700:1, about 600:1, about 500:1, about 400:1, about 300:1, about 200:1, about 100:1, about 90:1, about 80:1, about 70:1, about 60:1, about 50:1, about 40:1, about 30:1, about 20:1, about 10:1, about 7:1, about 5:1, about 3:1, about 1:1, about 1:3, about 1:5, about 1:7, about 1:10, about 1:20, about 1:30, about 1:40, about 1:50, about 1:60, about 1:70, about 1:80, about 1:90, about 1:100, about 1:200, about 1:300, about 1:400, about 1:500, about 600, about 1:700, about 1:800, about 1:900, or about 1:100.

In some embodiments, the total amount of magnetic particle in the flexible composite material ranges between about 1% to about 70% (w/w). In some embodiments, the total amount of magnetic particle in the flexible composite material is about 1% (w/w), or about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 30%, about 35%, about 40%, about 45%, about 50%, about 55%, about 60%, about 65%, or about 70% (w/w), or more.

In some embodiments, the total amount of polymer in the flexible composite material ranges between about 1% to about 70% (w/w). In some embodiments, the total amount of polymer in the flexible composite material is about 1% (w/w), or about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 30%, about 35%, about 40%, about 45%, about 50%, about 55%, about 60%, about 65%, or about 70% (w/w), or more.

In some embodiments, the flexible composite material comprises an additive, such as a light absorbing dopant or an additive that increases the thermal conductivity of the flexible composite material. The flexible composite material may be formed into a variety of formats that include, but are not limited to magnetic films, both rigid and elastic, sponges, monoliths, and hydrogels.

Light absorbing dopants can enhance the absorption capabilities of the flexible composite material. The light absorbing dopants can be particles, such as pigments, dispersed within the flexible composite material or can be molecules, such as dyes, dissolved within the flexible composite material.

In some embodiments, the provided flexible composite material is adhered to a substrate or article. Suitable substrates or articles of manufacture include 2- or 3-dimensional materials, both soft and hard.

In some embodiments, suitable substrates or articles of manufacture include an exterior surface and pores. During manufacture, the flexible composite material may be deposited onto the exterior surface and into the pores such that the flexible composite material is adhered or cured onto at least a portion of the exterior surface and pores. In some embodiments, the article of manufacture is characterized by its flexibility such that when the article of manufacture contacts an object it substantially conforms to the object's surface.

Non-limiting examples of useful substrates or articles of manufacture include, but are not limited to: papers, polyimide, polyethylene, latex, nitrile, natural fabric, synthetic fabric, silk fabric, metals, liquid crystal polymer, palladium, glass and other insulators, silicon and other semiconductors, metals, cloth, textiles, fabrics, plastics, biological substrates, such as cells and tissues, protein- or biopolymer-based substrates (e.g., agarose, collagen, gelatin, etc.), wood, ceramic and any combinations thereof.

Actuator System:

In one embodiment, the flexible composite material may be used in a thermal-sensitive actuator system. In general, the thermal-sensitive system comprises an actuator, a magnet, and a heating system. The actuator may be composed of one or more flexible composite materials, such as those described above. In one embodiment, the magnet system is configured to apply a magnetic field over at least a portion of the actuator, and in some forms, comprises a permanent magnet, temporary magnet, an electromagnet, and combinations thereof. In one embodiment, the heating system is configured to apply heat to at least a portion of the actuation. For example, the heating system may be configured to apply heat to at least a portion of the actuator for a duration sufficient such that the actuator moves in response to the magnetic field and at least a portion of the magnetic dopants in the actuator reaching the Curie temperature.

As described, the composition of the flexible composite material may be configured into an actuator that has a variety of formats, geometries, and/or shapes. Exemplary shapes include, but are not limited to a wheel that rotates in response to the magnetic field and at least a portion of the magnetic dopants reaching the Curie temperature; and a grapple having one or more opposing lever configured to pinch and retract in response to the magnetic field and at least a portion of the magnetic dopants reaching the Curie temperature.

Suitable permanent magnets may include magnets that retain their magnetism once magnetized. Exemplary permanent magnets for use in the actuator system include, but are not limited to magnetic metallic elements, rare-earth magnets, and magnetic composites. Exemplary magnetic metallic elements include, but are not limited to iron, cobalt, nickel, and rare earth elements (e.g., gadolinium and dysprosium). Exemplary magnetic composites include, but are not limited to, ceramic, ferrite, and alnico magnets such as iron oxide, barium carbonate ceramic, strontium carbonate ceramic, and aluminum-nickel-cobalt composites. Exemplary rare-earth magnets include, but are not limited to samarium-cobalt and neodymium-iron-boron (NIB) magnets.

Suitable electromagnets generally include those that can produce a magnetic field using an electric current, such as a wire wound into a coil. The electromagnets in the actuator system may be configured to be pulsed or oscillated. Design of electromagnets suitable for applications requiring oscillation and pulsing is well known to those skilled in the art.

Suitable heating systems for use in the actuator system generally include those that can transfer energy from a heating source to at least a portion of the actuator. In some cases, the heating system can be remote from the actuator. In some cases, the heating system can be integrated within the actuator. The heating source may transfer heat using radiation heating, advection heating, conductive heating, and convective heating. Exemplary heating systems may include, but are not limited to light irradiating systems, lasers, heated wires, and the like.

In one embodiment, the present disclosure relates to a method of using a flexible composite material as an actuator. In general, the method comprises heating a flexible composite material, such as those described above, to a temperature sufficient to raise the temperature of at least a portion of the composite material above a Curie temperature of one or more magnetic particles in the composite material. In some embodiments, the composite material may include at least one polymer and the one or more magnetic particles dispersed throughout at least a portion of the composite material. In one embodiment, the polymer comprises silk fibroin. In another embodiment, the polymer comprises poly(dimethylsiloxane) (PDMS), or mixtures of silk fibroin and PDMS. In one embodiment, the heating is remote, for example, the heating may be performed using one or more heating source described above. In one non-limiting example, the heating step includes illuminating the composite material with light in an amount sufficient to raise the temperature above the Curie temperature of the one or more magnetic particles in the composite material.

In one embodiment, the present disclosure relates to a method of making a flexible composite material. In general, the method includes casting a layer of material comprising at least one polymer and a plurality of magnetic particles. The material is then formed into an actuator. The material may include any of the polymers and magnetic particles described above.

EXAMPLES

The following examples set forth, in detail, ways in which the flexible composite material may be synthesized, and will enable one of skill in the art to more readily understand the principles thereof. The following examples are presented by way of illustration and are not meant to be limiting in any way.

Example 1

The present example describes the method steps of forming a flexible composite material and an actuator system in accordance with the present disclosure.

FIG. 1 at panels a-k illustrate several non-limiting example flexible composite material formats in accordance with the present disclosure. To illustrate the facile preparation and multiple possible forms obtainable of such light-responsive composites, several material formats were generated and reshaped in multiple geometries ranging from magnetic films, both rigid and elastic, to sponges, monoliths, and hydrogels.

Figure 5:
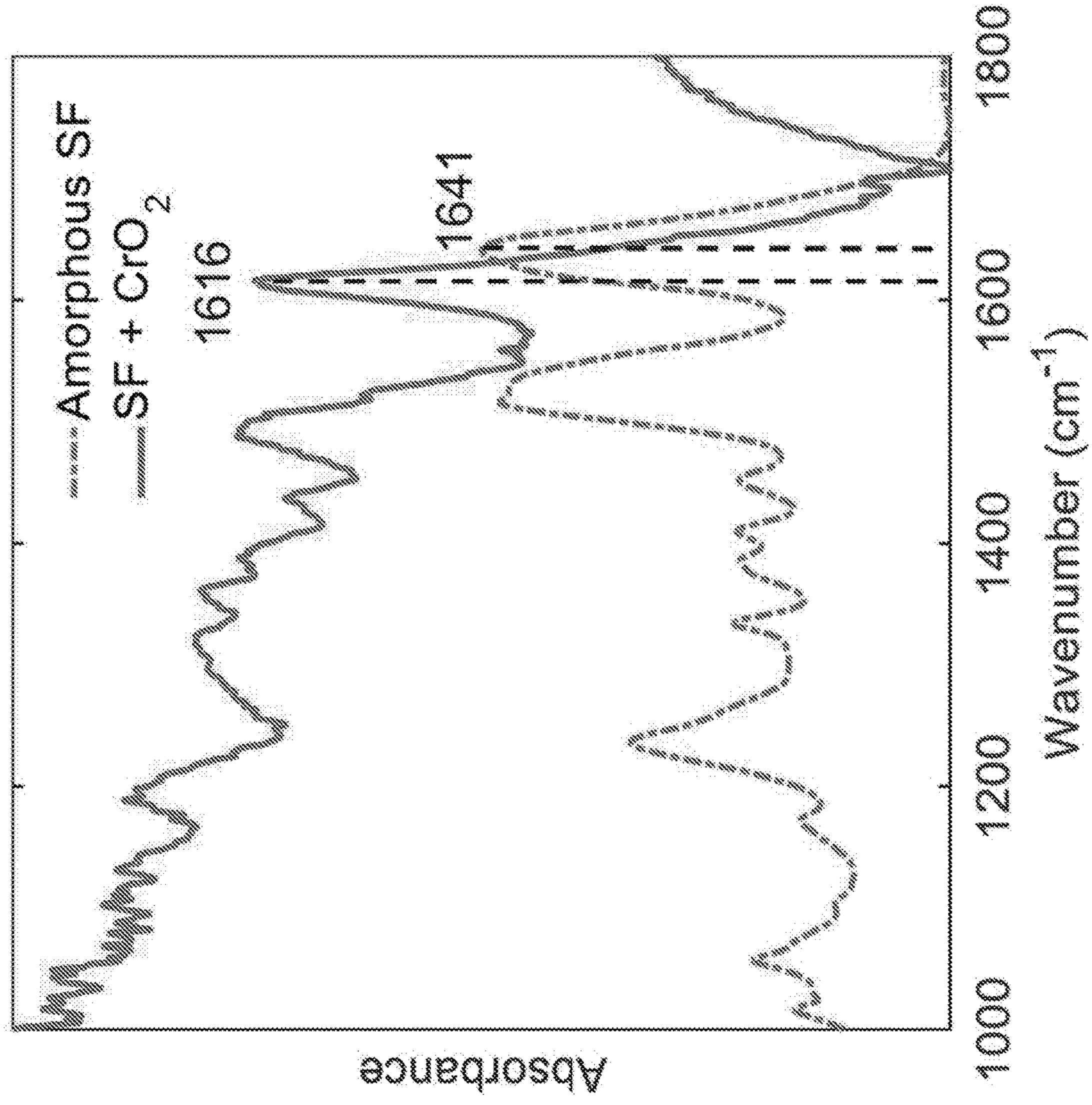
FIG. 5 is a non-limiting example of a FTIR spectra of 50% magnetic silk fibroin film and amorphous silk fibroin film in accordance with some aspects of the present disclosure. The peak at 1641 $cm^{-1}$ in amide-I band of amorphous silk fibroin film shifts to 1616 $cm^{-1}$ for magnetic silk fibroin samples, which indicates that a more crystalized β-sheet structure is introduced in the composite.
Figure 6:
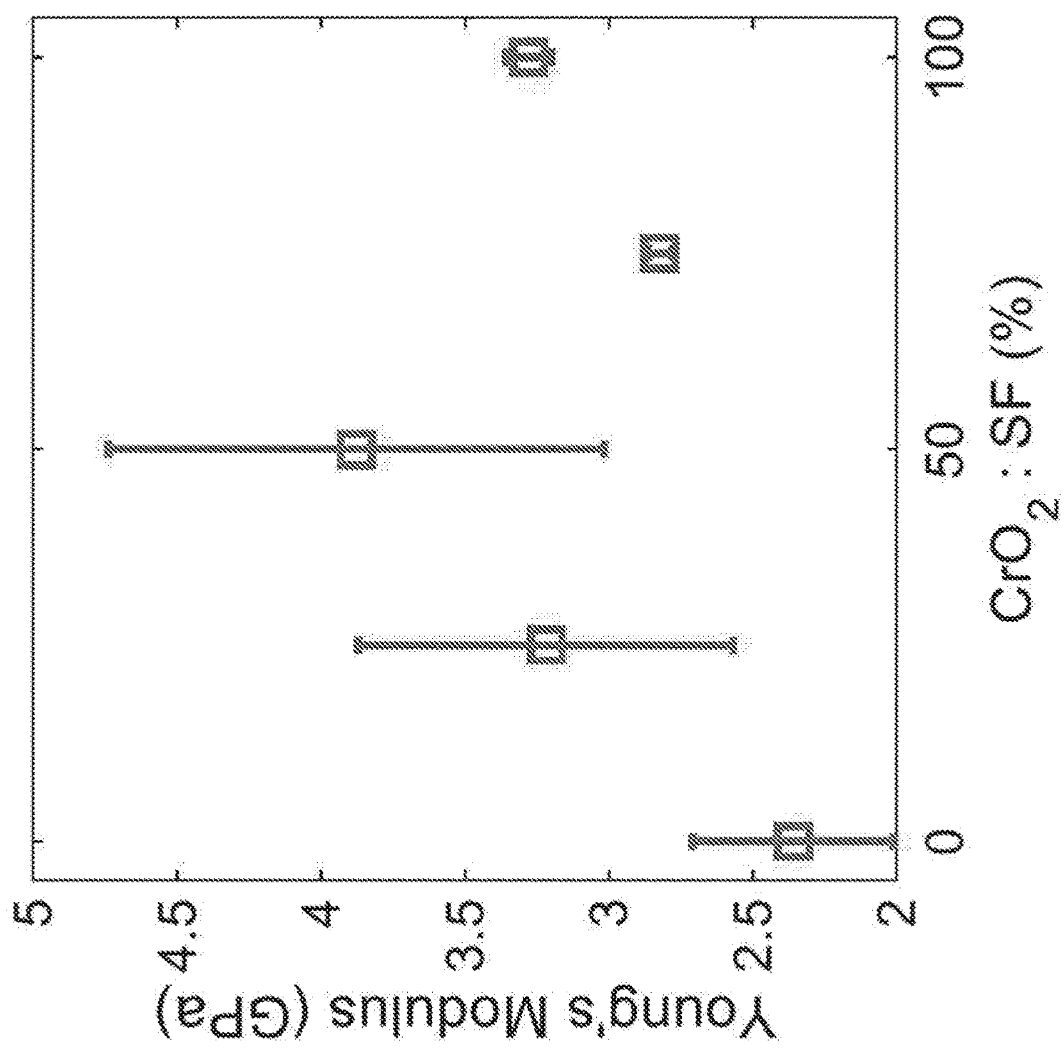
FIG. 6 is a non-limiting example of a Young's modulus (E) graph of a silk fibroin film and magnetic silk fibroin films with different loading percentages in accordance with some aspects of the present disclosure. An increase of E of all magnetic samples are observed compared to pure SF samples. The error bar is ±standard deviation for n=4.

It is worth observing that the free-standing magnetic SF film is flexible and not transparent (FIG. 1, panel a) and that the addition of $CrO_2$ into the SF matrix causes physical crosslinking of the protein, inducing β-sheet structure (FIG. 5), thereby rendering the film (largely) water insoluble. Additionally, the mechanical properties of the magnetic SF composite film are modified with an increase in Young's modulus in comparison to pure SF films, as shown in FIG. 6.

Figure 7:
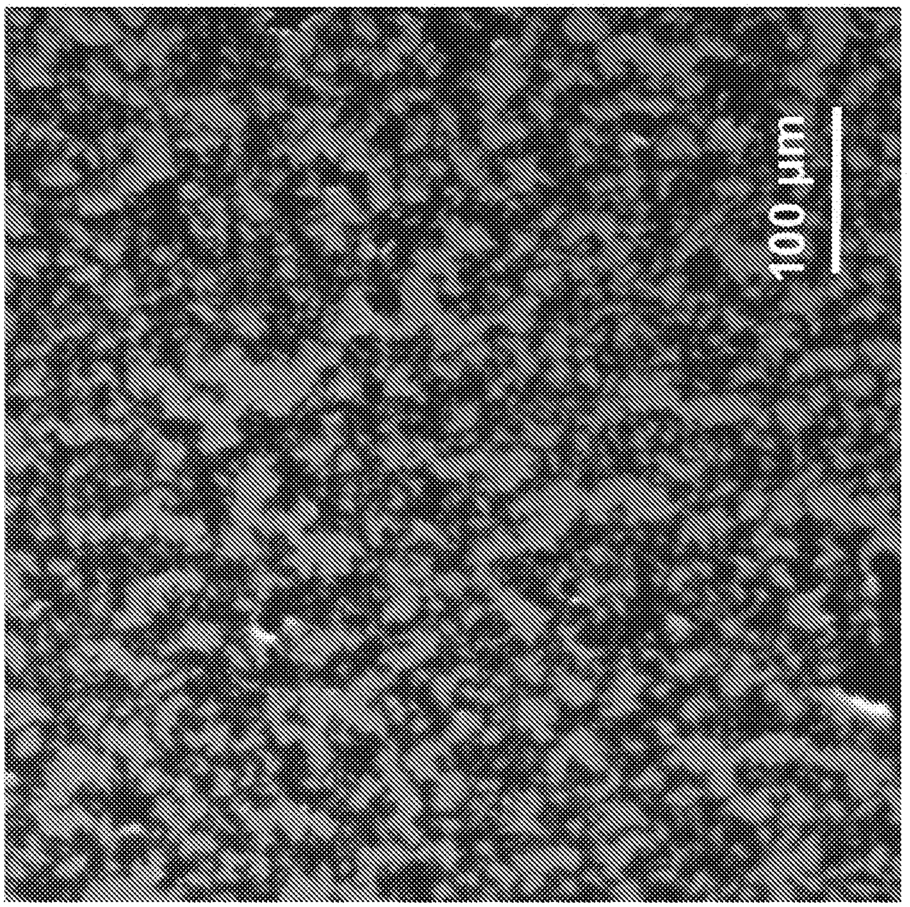
FIG. 7 is a non-limiting example of an optical microscopic image of a 5% magnetic SF film in accordance with some aspects of the present disclosure. An in-plane homogeneity of $CrO_2$ in SF matrix is presented.

The $CrO_2$ particles are uniformly distributed in-plane (FIG. 7), but a gradient structure is present out of plane (FIG. 1, panel b). The composite side with higher $CrO_2$ concentration will be referred to subsequently as the C-side, while the other will be either the S-side (for SF composites) or the P-side (for PDMS composites). This gradient stems from the relatively big size of the $CrO_2$ particles and the sedimentation process that occurs during film drying, which results in a higher $CrO_2$ concentration on one side (the bottom) of the film. The $CrO_2$ gradient can be seen in SEM images of the films' cross-section (FIG. 1 at panel c and f). Magnetic PDMS can be easily molded into different shapes and can be formed into various patterns (FIG. 1 at panel d & e). Additional light-active magnetic material formats can be obtained by leveraging SF's polymorphism to generate magnetic sponges, monoliths and hydrogels (FIG. 1 at panels g-i). These composites show strong magnetic responses and can be simply manipulated with a permanent magnet (FIG. 1 at panel j).

The materials as composed are light-responsive and can be actuated following the simple mechanism outlined in FIG. 1 at panel k. A $CrO_2$-composite cantilever is formed and placed in a magnetic field generated by either a permanent magnet or an electromagnet. The field amplitude exceeds the material's coercivity and thus the magnetic force is attractive. The cantilever bends towards the magnet and reaches an equilibrium state where the magnetic force and elastic force are balanced. When the magnetic composite is illuminated by light, such as a laser or sunlight, it converts photonic energy into thermal energy causing an increase of the cantilever temperature. Because of the ferromagnetic nature of the material, as the temperature T goes up, the local magnetic susceptibility $\chi$ is decreased. The magnetic attractive force applied on the sample is $F=(m\cdot\nabla)B$, with the magnetization $$m = \frac{\chi}{\mu_0}B.$$

While the magnetic field profile stays unchanged, the force F decreases with lower susceptibility $\chi$ resulting from higher temperature. According to Euler-Bernoulli beam theory, a smaller magnetic force, leads to a smaller beam deflection because of the decreasing load. The cantilever, consequently, moves away from the magnet resulting in an even smaller magnetic field amplitude B and gradient $\nabla B$. Thus, the activation is further enhanced until a new equilibrium position is achieved. After the light source is removed, the actuator temperature recovers to the surrounding temperature causing the magnetization to increase with the temperature decrease and reversing the deflection.

Material response time and performance may depend on the photothermal conversion efficiency since the temperature change induced by the light directly determines the amplitude and the time scale of magnetization loss. The effect is analyzed by forming magnetic SF film strips (8 mm×2 mm) with different $CrO_2$ loading percentages and evaluating the material response when exposed to a 2 cm diameter continuous wave laser beam ($\lambda$=532 nm). Film thickness for different loading percentages is listed below in Table 1.

TABLE 1

Thickness of magnetic SF/PDMS strips. The value is mean ± standard deviation of measurements of three spots on sample.

| | Sample 1 (μm) | Sample 2 (μm) | Sample3 (μm) |
|---|---|---|---|
| 25% $CrO_2$ to SF | 33 ± 3 | 32 ± 2 | 24 ± 1 |
| 50% $CrO_2$ to SF | 36 ± 2 | 32 ± 2 | 29 ± 1 |
| 75% $CrO_2$ to SF | 46 ± 4 | 44 ± 2 | 45 ± 3 |
| 100% $CrO_2$ to SF | 55 ± 3 | 50 ± 3 | 46 ± 2 |
| 50% $CrO_2$ to PDMS | 115 ± 4 | 11 1± 3 | 105 ± 5 |

The light intensity distribution on a transverse plane has a Gaussian profile and the sample is located in the center of the beam. The total power incident on the sample is calculated by integrating the Gaussian intensity distribution of light with respect to the sample location and its surface area. The temperature is measured with an IR camera by averaging the peak value over a one-minute period once the temperature stabilizes.

Figure 2:
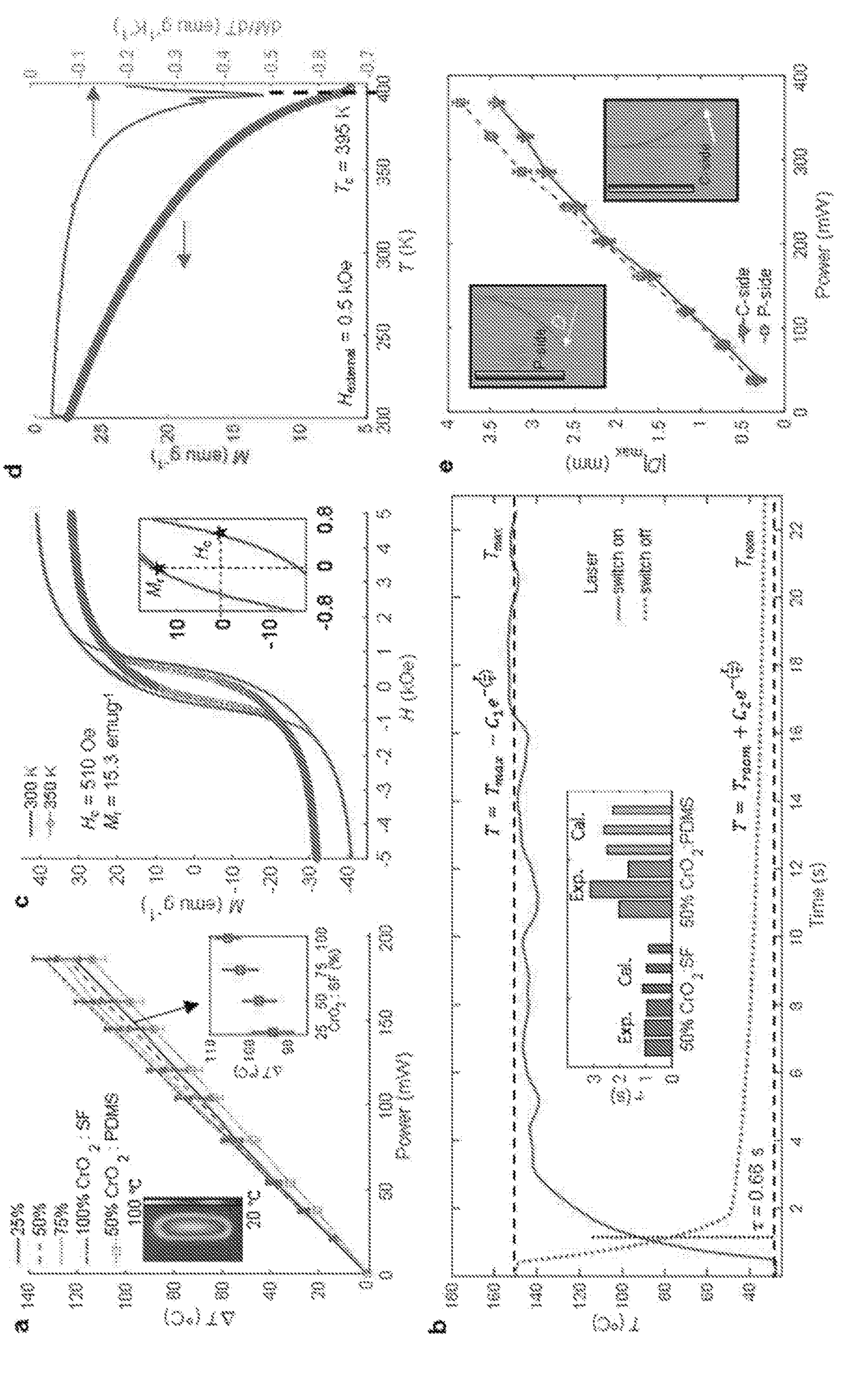
FIG. 2 are graphs illustrating non-limiting example photothermal responses and thermal-demagnetization properties of flexible composite materials in accordance with some aspects of the present disclosure.
Figure 8:
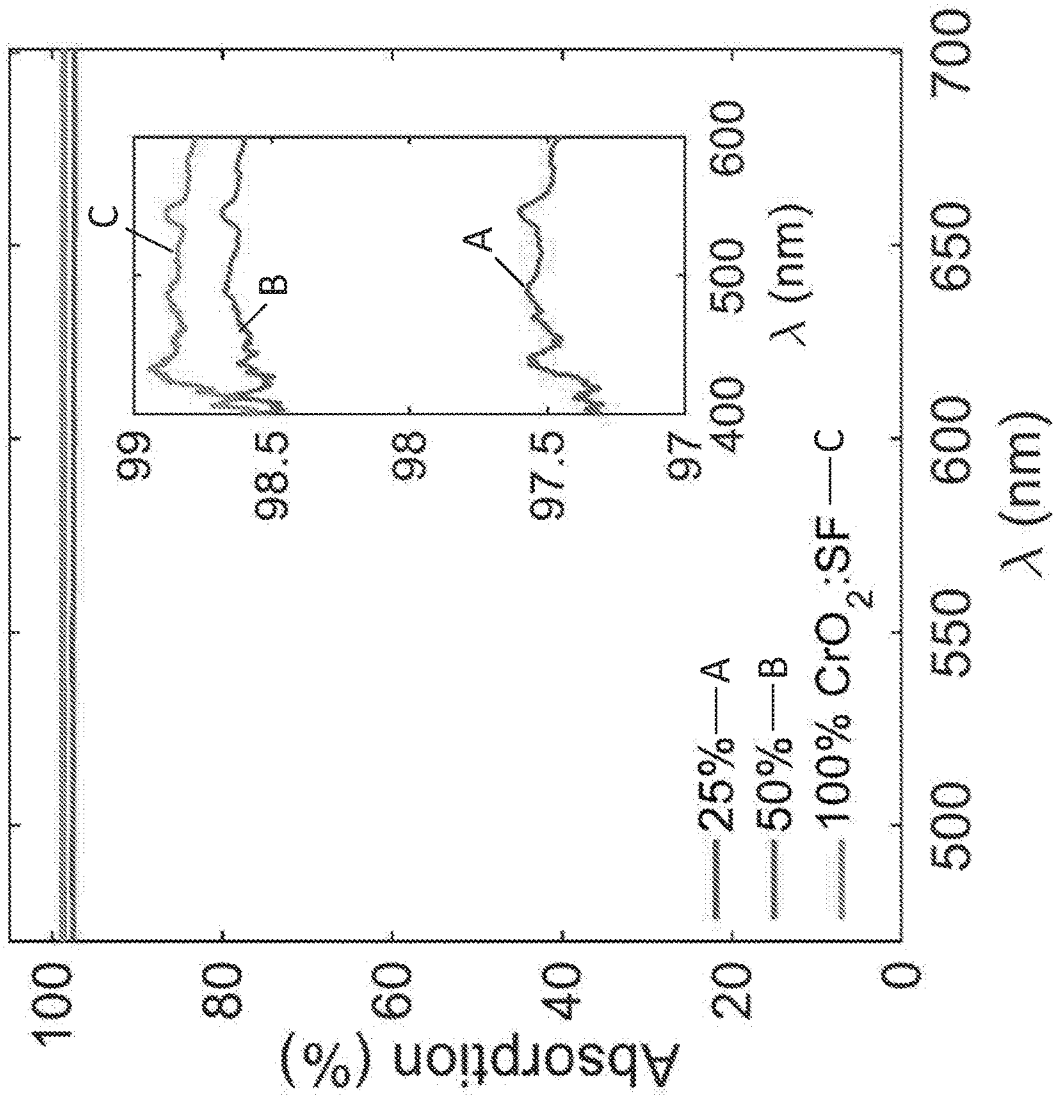
FIG. 8 is a non-limiting example of a photo-absorption graph of magnetic SF strip samples over the visible light spectrum in accordance with some aspects of the present disclosure. All loading percentages show a light absorption above 97% for all wavelength between 400 nm-700 nm. Line labeled "A" corresponds to 25% $CrO_2$:SF (w/w), line labeled "B" corresponds to 50% $CrO_2$:SF (w/w), and line labeled "C" corresponds to 100% $CrO_2$:SF (w/w).
Figure 9:
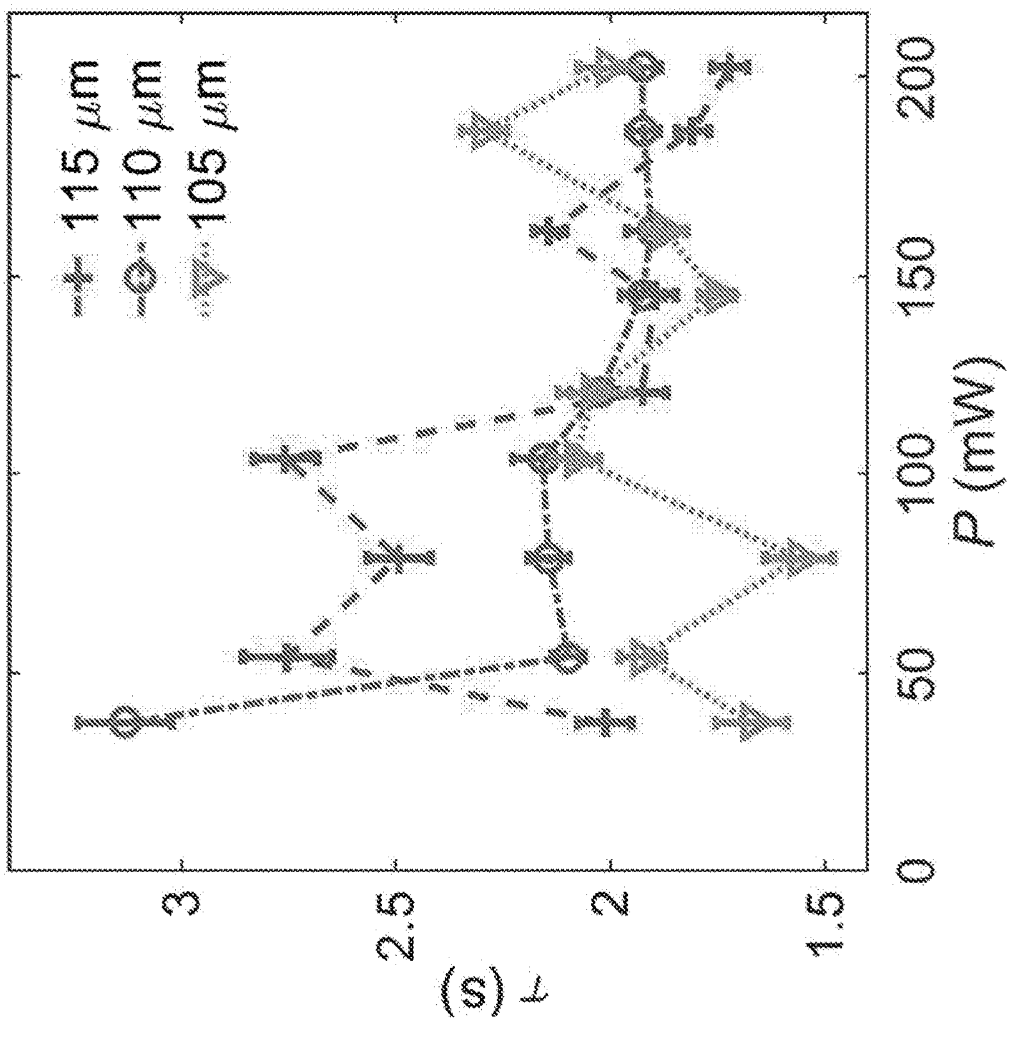
FIG. 9 is a non-limiting example of a thermal relaxation time graph for 50% magnetic PDMS strips with different thickness materials in accordance with some aspects of the present disclosure. Error bars indicates 95% confidence interval of curve fitting by exponential function.
Figure 10:
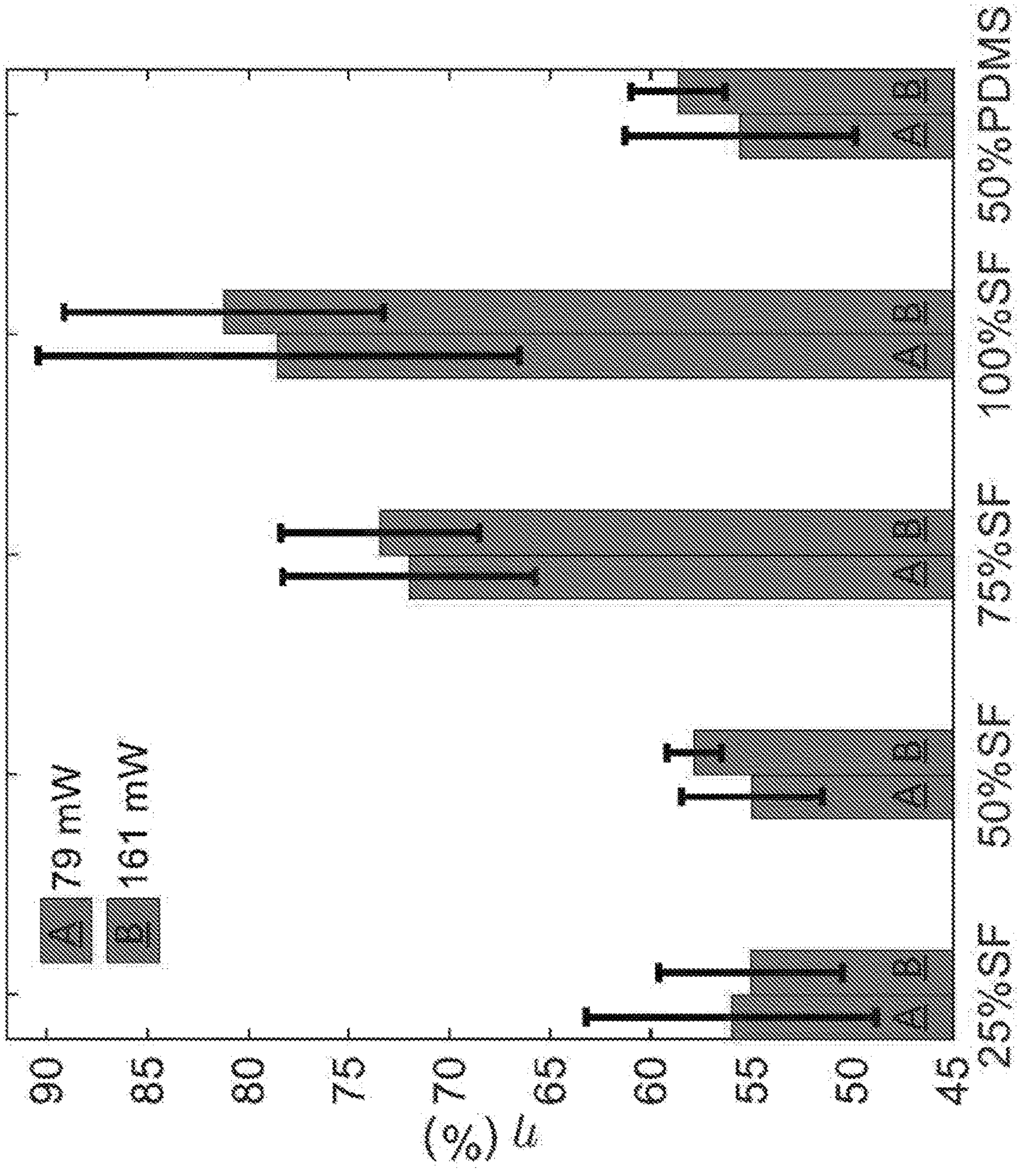
FIG. 10 is a non-limiting example of a calculated thermal efficiency for magnetic SF with loading percentage 25% $CrO_2$:SF (w/w), 50% $CrO_2$:SF (w/w), 75% $CrO_2$:SF (w/w) and 100% $CrO_2$:SF (w/w), and for 50% magnetic PDMS $CrO_2$:PDMS (w/w) samples under 79 mW and 161 mW illumination power in accordance with some aspects of the present disclosure. Error bars are ±standard deviation of three samples.
Figure 11:
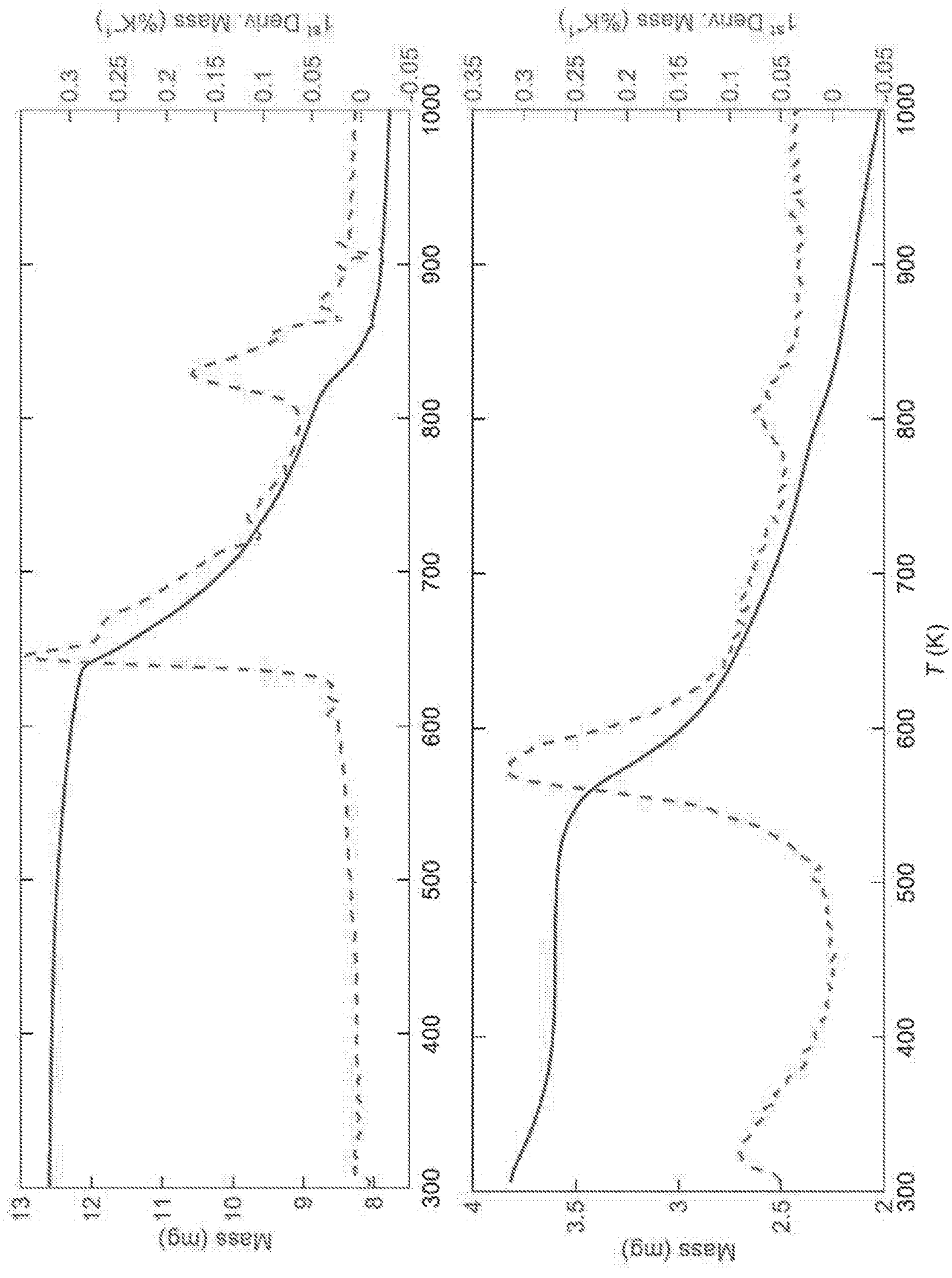
FIG. 11 is a non-limiting example of a graph illustrating thermal gravimetric results for 50% magnetic PDMS (top) and 50% magnetic SF (bottom) in accordance with some aspects of the present disclosure. Bound water content in SF sample is 5.64 wt % from mass loss below 100° C. The thermal degradation onset temperature for 50% magnetic PDMS and 50% magnetic SF are 631 K and 550 K respectively.

The temperature variation is found to be linearly dependent on the incident power at specific loading percentages (FIG. 2 at panel a). A 100% magnetic SF film exhibits a temperature increase of 105° C. from room temperature ($T_{room}$=26° C.) for an incident power P=145 mW. The maximum measured temperatures are not significantly affected by different $CrO_2$ loading percentages and are found to be within 12° C. of one another (FIG. 2 panel a, inset). This is attributed to the high light absorption at all loading percentages, as shown in FIG. 8. The thermal relaxation time τ is measured by sequential exposure to light (on/off laser switching cycles) and estimated with an exponential function according to Newton's Law of cooling:

$$\text{Heating}: T = T_{max} - (T_{max} - T_{room})e^{-\left(\frac{t}{\tau}\right)}$$

$$\text{Cooling}: T = T_{room} - (T_{room} - T_{max})e^{-\left(\frac{t}{\tau}\right)}$$

where $T_{max}$ and $T_{room}$ are the stable heating temperature and room temperature respectively. The thermal relaxation time τ for a 24 μm thin 50% magnetic SF film is 0.66 s±0.04 s (mean±95% c.i.) under illuminating power 190 mW (FIG. 2*b*). For a 110 μm thick magnetic PDMS, with same illumination power, τ value is found to be 1.92 s±0.04 s, as shown in FIG. 9. τ can also be theoretically estimated by τ=ρCb/h, where ρ is the sample density, C is the heat capacity, b is the sample thickness and h is the heat convection coefficient. Using the measured value of C, the calculated τ values are in good accordance with experimental values (FIG. 2 at panel b, inset) suggesting that $CrO_2$ dominates the heating process. This is further corroborated by the fact that illumination occurs from the C-side, and the thermal camera mainly measures the surface temperature, as shown in FIG. 10. Exposure of the magnetic composite materials to the temperatures above does not significantly affect the material or cause it to undergo weight loss, as confirmed by thermogravimetric analysis of the samples that show a thermal degradation onset temperature are 277° C. and 358° C. for 50% magnetic SF and 50% magnetic PDMS respectively, as shown in FIG. 11.

Figure 12:
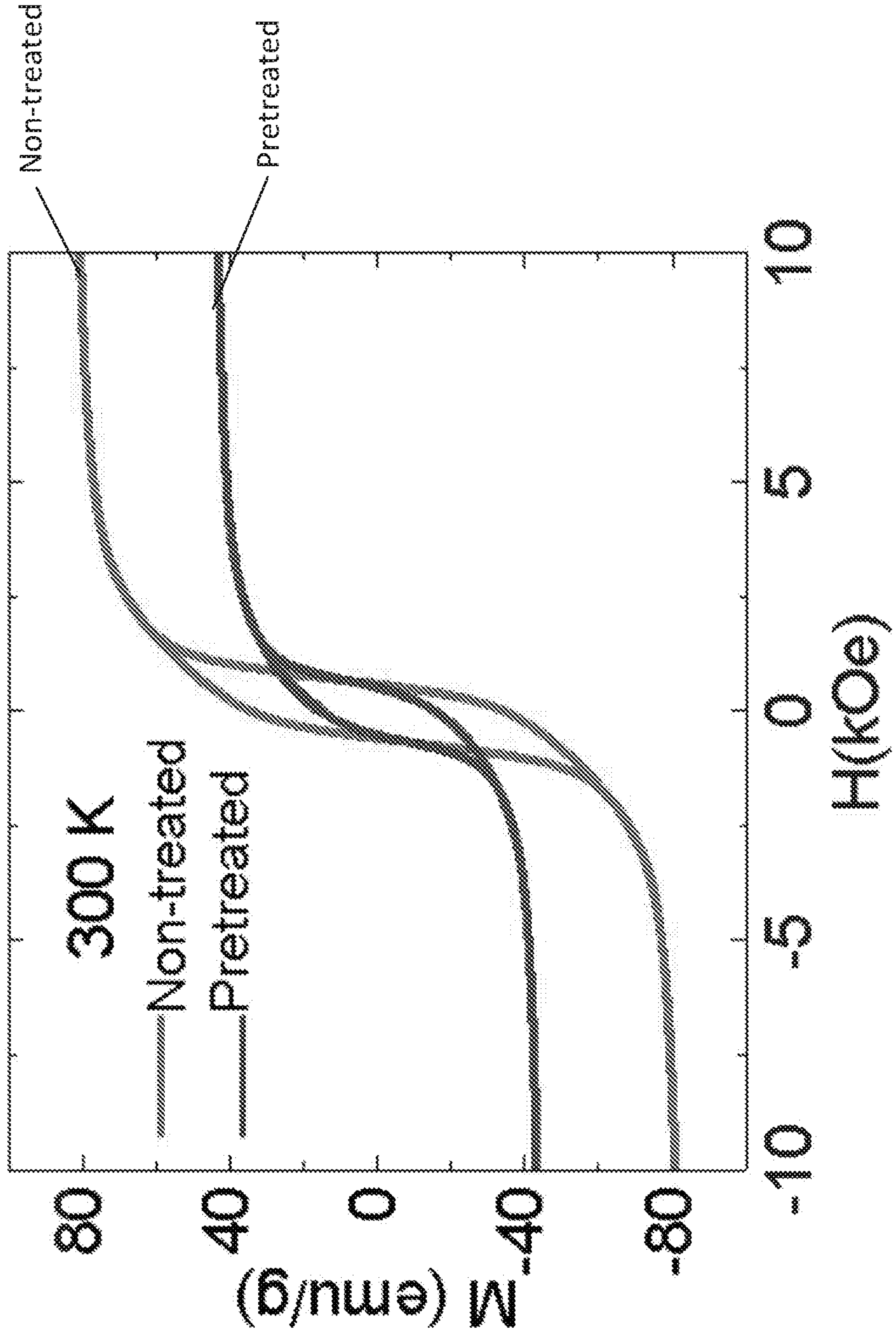
FIG. 12 is a non-limiting example of a graph illustrating a Hysteresis loops for non-stabilized and stabilized $CrO_2$ powder at 300 K in accordance with some aspects of the present disclosure. The non-treated $CrO_2$ has saturated magnetization of 80.8 emu $g^{-1}$ while pretreated ones have 43.2 emu $g^{-1}$ saturated magnetization. However, the pretreated ones are more chemically inert in water and solvents, which helps distribute $CrO_2$ in SF/PDMS with improved homogeneity.

The effect of the pretreatment process on the magnetic properties of the $CrO_2$ powder is also investigated. Magnetic hysteresis loops are measured for pretreated $CrO_2$ powder at 300 K and 350 K (FIG. 2 at panel c) showing high saturated magnetization values of 43.2 emu $g^{-1}$ and 35 emu $g^{-1}$ respectively. The received non-treated $CrO_2$ has saturated magnetization of 80.8 emu $g^{-1}$ (FIG. 12) revealing a trade-off between the stability necessary for material processing and a variation in the baseline magnetic responses. The measured remnant magnetization $M_r$ and coercivity $H_c$ is 15.3 emu $g^{-1}$ and 510 Oe, consistent with values reported in the literature. The Curie temperature, Tc, is defined as the point which has the smallest value of first derivative (dM/dT) of the magnetization M against temperature T, and is measured to be 395 K (122° C.) (FIG. 2 at panel d), with the discrepancy from tabulated values attributed to the introduction of the pretreatment barrier/protective layer that may lead to an increase of the Curie temperature compared to pure, unmodified $CrO_2$.

Figure 13:
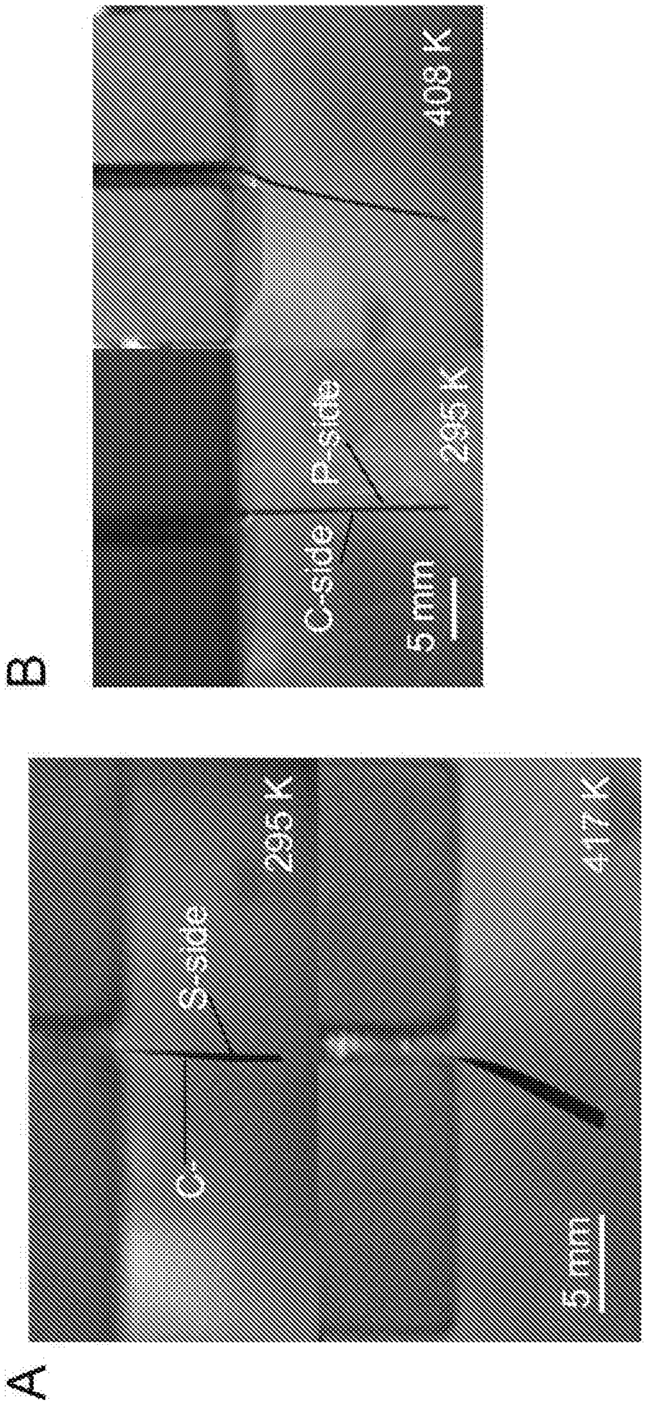
FIG. 13 shows non-limiting examples of images of magnetic silk fibroin composite materials and PDMS composite materials in accordance with some aspects of the present disclosure.
Figure 14:
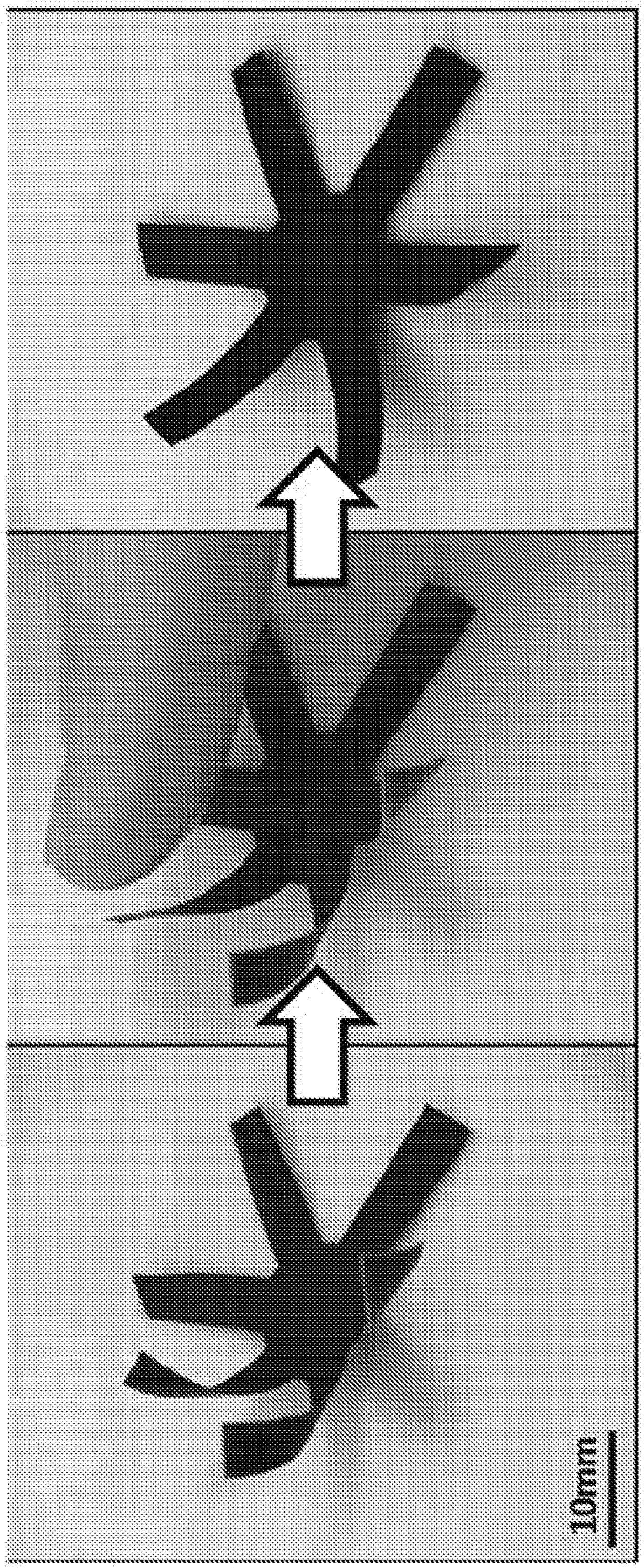
FIG. 14 is a non-limiting example of a series of images showing magnetic silk fibroin films responding to a humidity change in accordance with some aspects of the present disclosure. The flower-shaped magnetic SF sample is placed with S-side facing up (left). A wet finger approaches the film (middle) and the petals start to uncurl (right). After a short period of time, they curl back to their original position.

The vertical $CrO_2$ gradient described previously causes an inequivalent expansion of the two sides of the magnetic composite when exposed to heat (FIG. 13), humidity (FIG. 14), and light, resulting in mechanical deformation. To quantify light-driven actuation, a simple elastomeric cantilever (100 μm thick, 8 mm×2 mm) is evaluated under different illuminating power as shown in FIG. 2 at panel e. The cantilever displacement D is defined as the displacement of the cantilever tip compared to the original position with no illumination. For received laser power of 368 mW, D reaches-3.86 mm+0.10 mm for P-side and 3.42 mm+0.09 mm for C-side illumination. The length elongation of the P-side and C-side is 5.6% and 4.4% respectively for P-side and C-side illumination.

Figure 3:
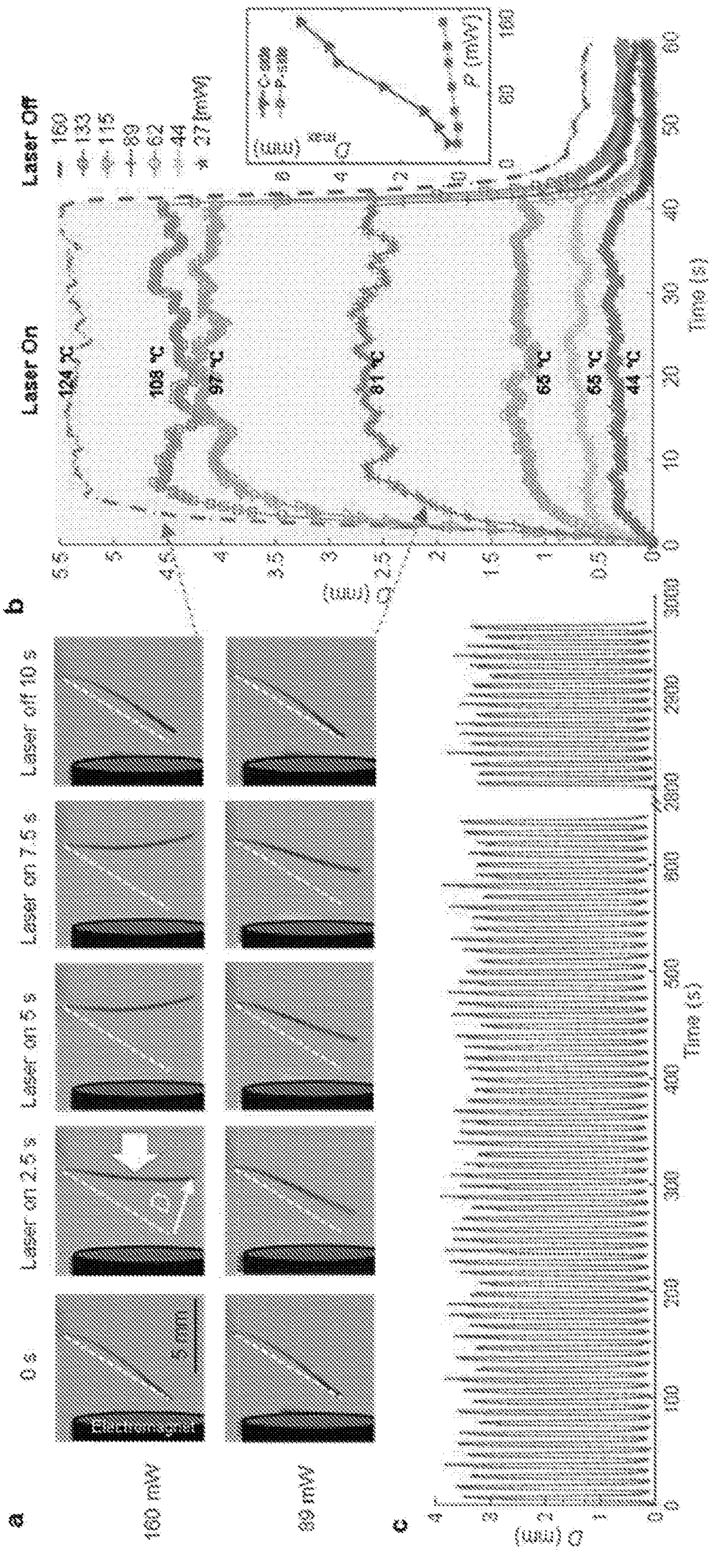
FIG. 3 shows non-limiting examples of light-induced actuation of a 50% magnetic PDMS strip in accordance with some aspects of the present disclosure.

FIG. 3 at panel a shows frames of recorded videos at t=0, 2.5, 5, 7.5 s after laser is switched on and 10 s after laser is switched off. Values of the measured deflection D values plotted against time for different laser intensities are shown in FIG. 3*b*. When the cantilever is lifted by the electromagnet, the magnetic field is 30 mT at the cantilever tip. With higher laser power, the actuating speed is faster and the corresponding maximum displacement is larger. As one can see in FIG. 3 at panel b, for higher laser powers the cantilever does not recover to its original position after the laser is switched off. With repeated heating and cooling process, the cantilever always returns to the same position accurately (within 100 μm difference). This can be explained with the following. Before each experiment, the cantilever is magnetized with a ~400 mT external field horizontally to maximize the magnetic force between the cantilever and the electromagnet.

The magnetic field from the electromagnet does not exceed the coercivity of the cantilever. When it is illuminated by laser, with temperature raises, the coercivity decreases and the magnetic field realigns the magnetic dipoles and decreases its net magnetization since the magnetic field is weaker as the distance is further away from the electromagnet. Thus, the total attractive force between the cantilever and the electromagnet is smaller after the heating process compared to the initial condition, which results in a smaller deflection of the cantilever. By directing light on different sides (C-side or P-side) of the composites significantly different actuations can be achieved (FIG. 3 at panel b, inset) at the same incident light power. Finally, the elastomeric composite was evaluated for performance cycling the cantilever 300 times by switching the laser on/off with 5 s/5 s period. The performance did not deteriorate, which implies mechanical operation in the elastic range and a total recovery of the magnetization when the temperature decreases (FIG. 3 at panel c).

Figure 4:
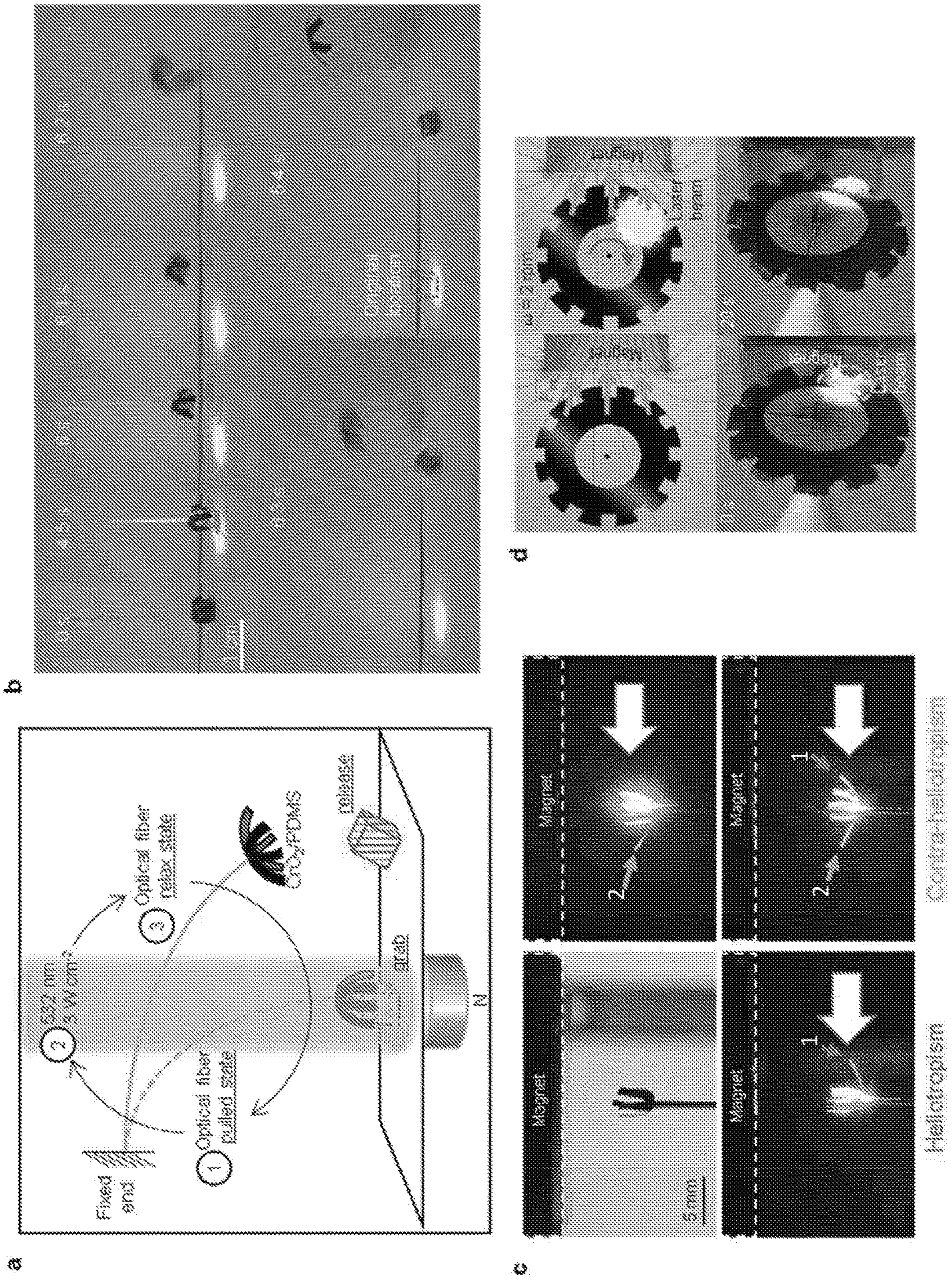
FIG. 4 shows non-limiting example applications of actuators by light induced demagnetization in accordance with some aspects of the present disclosure.

These types of composite material strategies and their interplay with light can be used to achieve complex multi-scale untethered actuation and generate interesting applications in reconfigurable surfaces, locomotion, or soft robotics while using light as an external control. Demonstrator devices based on this approach were studied to illustrate complex movement with simple illumination. Options for light modulation and patterning along with material conditioning remain available to increase the utility of these systems. The ability to generate an opto-magnetic elastomeric composite can enable soft grippers to capture and release objects in response to light illumination. A demonstrator device is illustrated in FIG. 4 at panel a. A shaped $CrO_2$/PDMS "claw-like" structure with multiple "fingers" is attached to the tip of an optical fiber with UV glue. This structure can be used as a small gripper tool given that the "fingers" of the claws experience cyclical tightening and loosening in response to the light-induced demagnetization and the changing magnetic force. A demonstration of this functionality has been carried out by having the structure grab and move an object (of size 4 mm×4 mm×3.5 mm and mass 2 mg) placed in proximity to the magnet in response to the illumination. The light used to actuate the device (λ=532 nm, $P_{total}$=3 W, beam diameter w ~1 cm) is provided by a laser that illuminates the structure from above and demagnetizes it. When the laser is switched on, the object is gripped, lifted, and eventually dropped away from its original location in a few (t~6) seconds. It is expected that larger loads can be handled with different combination of materials and magnets.

The same structure can also act like a resonator by suspending the structure above a permanent magnet so that the construct is pulled and bent towards the magnet and the "fingers" are closed. As the heat accumulates in the structure and temperature gradually increases, the attractive force on the structure correspondingly decreases leading to unbending of the optical fiber and opening of the fingers. While still being in the proximity of the magnetic field, the light-responsive structure is attracted towards the magnet and the optical fiber bends again and the fingers close. The resonating cycle continues as long as the light is on.

Compared to magnetic actuators, the use of light-responsive materials offers the advantage of being able to localize control and selectively actuate portions of the material. This can be shown by reshaping a piece of 130 μm thick magnetic PDMS film with 20 wt % $CrO_2$ into a flower-like geometry with 6 petals of equal dimensions (4 mm×1 mm). Because of the magnetic force between the permanent magnet and the film, the six "petals" are lifted towards the magnet located above as shown in FIG. 4 at panel c. Directing light onto an individual petal allows to move it without affecting the others. By mounting the structure onto a post, it is possible to address the "petals" sequentially by rotating the post in the path of the laser beam, causing that portion to heat up and lose its partial magnetization. In this way, the six branches can be alternatively and independently actuated.

Figure 15:
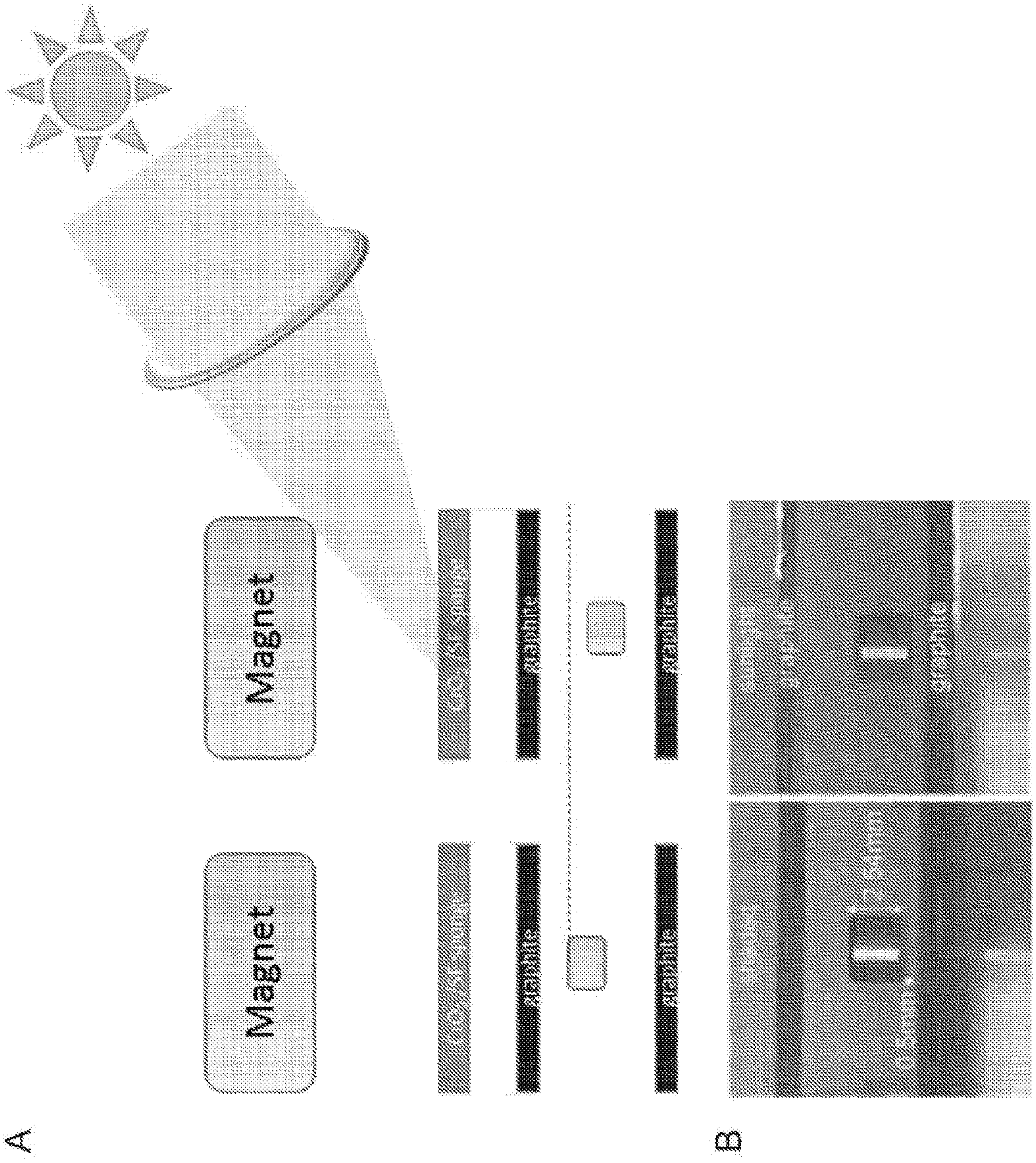
FIG. 15 shows non-limiting examples of a levitated permanent magnet with sunlight in accordance with some aspects of the present disclosure.

Only the illuminated portion of the material is actuated and the petal "opens" under the effect of gravity. These composites can be rationally designed to move with (heliotropic) or against (contra-heliotropic) the direction of incident light, which is usually not the case for uniform liquid crystal based photoactuators. It is worth noting that in this case the actuation does not depend on the $CrO_2$ gradient and the sample can be placed with either side facing up, unlike other photothermal actuators with gradient structures. These types of composites can also respond to sunlight and respond to solar irradiance. As an example, sunlight was used to control the vertical position of a levitated permanent magnet. A magnetic sponge composite is placed above a levitated magnet floating between two sheets of pyrolytic graphite, as shown in FIG. 15 at panels a-b. Focusing sunlight onto the sponge changes its magnetization and displaces the permanent magnet vertically. The magnet can be also moved in-plane by focusing sunlight on different spots of the magnetic SF sponge.

The combination of magnetic force and localized laser illumination can achieve more complex actuation patterns, beyond bending and twisting. A Curie engine powered by light is a simple demonstrator device of such actuation (FIG. 4 at panel d). A 1.5 mm-thick uniform magnetic PDMS film is reshaped into a ring structure that can freely rotate on a stainless-steel needle post in the presence of a permanent magnet. The laser beam ($\lambda$=532 nm, $P_{total}$=1.8 W, beam diameter ~1 cm) is focused onto a fixed spot on the ring and neither the magnet nor the laser beam is moved. Local demagnetization at the illuminated spot leads to local decrease of the magnetic susceptibility, while the magnetic susceptibility of the rest of the rotor stays unchanged. This results in an unbalanced net force in vertical direction which starts the rotation. The Curie engine as constructed can continuously rotate at a speed @=2 rpm.

The concepts presented here represent a comprehensive baseline of a composite platform that merges optomechanical and magnetic functions. Multiple material formats, manufacturing approaches, baseline characterization and initial device demonstration for light-activated material systems and actuators provide the underpinnings for expanded opportunities in functional, flexible materials. Additional magnetic field control and patterned material design to achieve complicated, non-homogeneous shape morphing, such as origami folding or auxetic material forms, sequenced valves and switches in microfluidic devices, solar powered sun tracking system, individual cilium movement control among others, are among the possible options offered by the platforms. Tailored light control can offer further control through shaped wavefronts, diffractive optics, and multispectral operation that can be matched to specific resonant co-dopants such as plasmonic nanoparticles. Alternative device designs along these lines open promising directions for future actuator concepts, biopolymer and elastomeric interfaces particularly when coupled with flexible electronic or soft robotic platforms and new modes of wireless, untethered dynamic interfaces.

Figure 16:
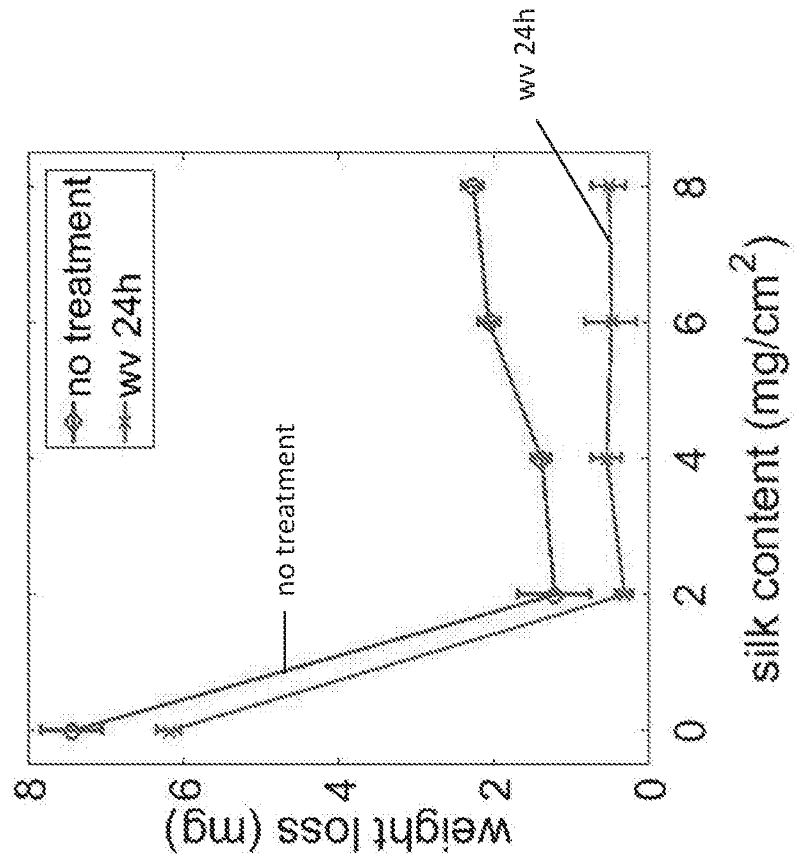
FIG. 16 shows a graph illustrating weight loss of substrates having a flexible composite material with varying silk fibroin concentrations adhered thereto after soaking the substrate in water for 24 hours in accordance with some aspects of the present disclosure.

Flexible composite materials may be adhered, painted, or printed on a substrate, such as paper. FIG. 16 shows a graph illustrating weight loss of substrates having a flexible composite material adhered thereto after soaking the substrate in water for 24 hours. FIG. 16 illustrates substrates with painted flexible composite materials having $CrO_2$ particles in different silk concentrations. Samples which are water vapor treated for 24 hours before water immersion show less particle leaking. All samples with silk added show significantly less particle leaking than those without silk added. Error bars in FIG. 16 are a standard deviation from three samples for each group.

Figure 17:
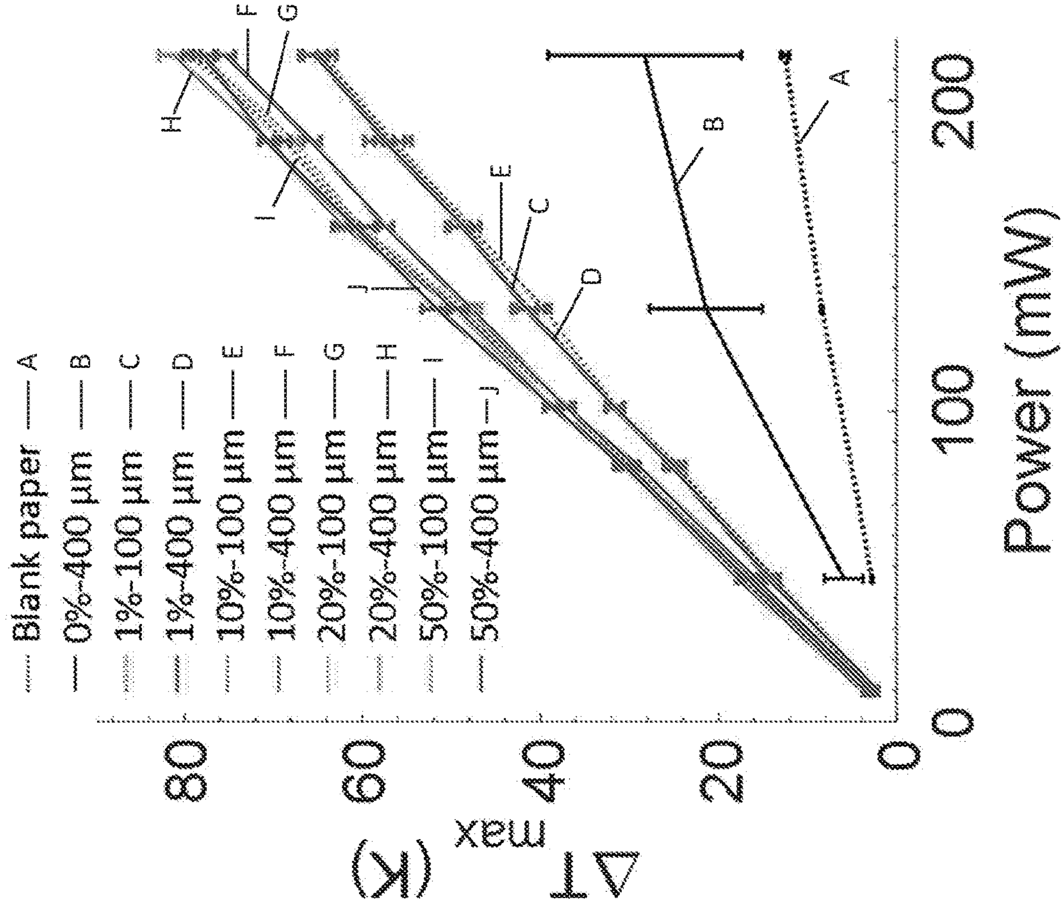
FIG. 17 shows a graph illustrating a change in temperature as a function of laser power on a sample including copy paper with $CrO_2$/PDMS ink adhered thereto in accordance with some aspects of the present disclosure.

FIG. 17 shows $CrO_2$/PDMS ink brushed on copy paper with different thickness (100 or 400 μm) with different $CrO_2$ concentration (0% to 50 wt % $CrO_2$ to PDMS, and are labeled C-J, respectively in FIG. 17). FIG. 17 shows a change in temperature as a function of laser power on the sample. Error bars in FIG. 17 are taken as the standard deviation of three samples for each group.

Figure 18:
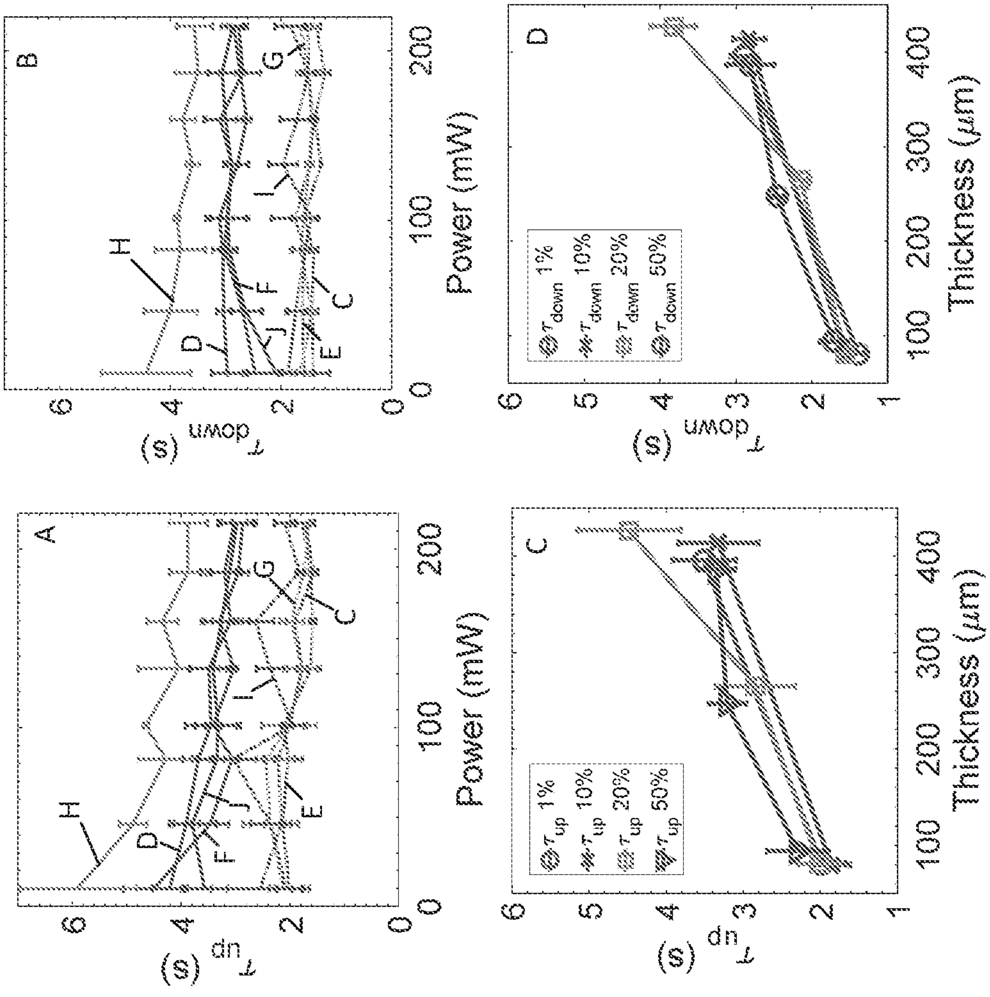
FIG. 18 shows thermal relaxation time $\tau_{up}$ and $\tau_{down}$ for heating up and cooling down of a substrate having different thicknesses of flexible composite material adhered thereto, and varying power levels, respectively.

FIG. 18 (panels a-d) show thermal relaxation time $\tau_{up}$ and $\tau_{down}$ for heating up and cooling down at different thicknesses of flexible composite materials of FIG. 17 (labeled C-J), and power level, respectively. Higher power does not grant a significantly faster response, however, a thinner ink layer results in a faster response time.

Figure 19:
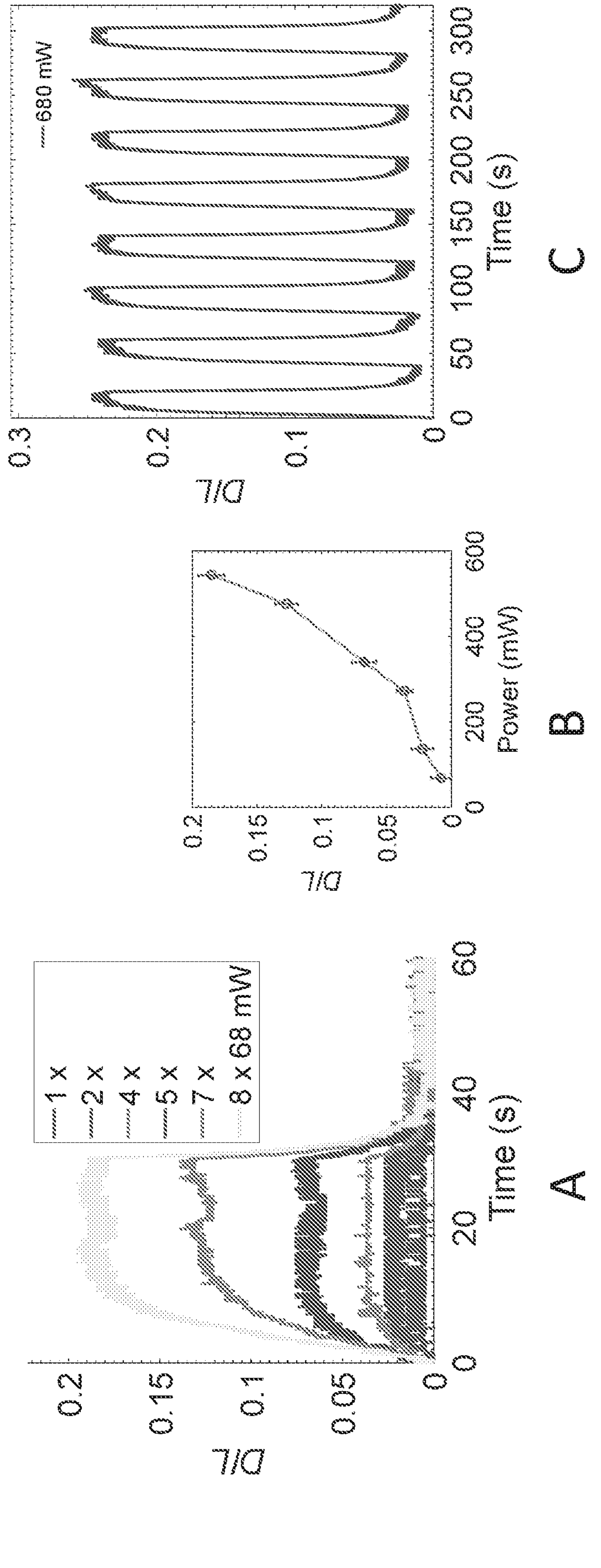
FIG. 19 shows a paper actuator (0.5 mm wide and 18 mm long) actuated by light with different power.

FIG. 19 (panels a-c) show a paper actuator (0.5 mm wide and 18 mm long) actuated by light with different power. The light is on for 60 seconds and turned off afterwards. The displacement over length ratio is plotted as a function of time and light power. Repeatability test are done with cyclic light on/off of 20 s/20 s. The illumination power is 680 mW on the sample.

Synthesis of Silk Fibroin

Silk fibroin are extracted from *Bombyx mori* cocoons. Similar methods have been previously reported, see for example Rockwood, D. N., et. al., Materials fabrication from *Bombyx mori* silk fibroin. *Nat. Protoc.* 5, 1612-1631 (2011). Briefly, shredded cocoons were boiled in 0.02 M sodium carbonate solution for 30 min to remove the sericin. After rinsing with deionized (DI) water and drying for over 12 h, the silk fibroin was dissolved in 9.3 M lithium bromide with the final concentration of the fibroin in lithium bromide of 20% wt/vol. The mixed solution was kept in 60° C. oven until fibroin fibers are totally dissolved (around 4 h). Afterwards, the solution was dialyzed in DI water for 48 h to remove the salt. The final fibroin aqueous solution has a concentration of ~7% wt/vol after purified two times by centrifugation at 8000 rpm for 20 min each.

Pretreatment of Magnetic Dopant

Chromium dioxide powder (480037, Sigma-Aldrich, USA) was firstly put in a vented oven for 2 h at 300° C. For every 88 g of $CrO_2$, a liter of 50 g/L sodium bisulfite solution was prepared and added to heat treated $CrO_2$ powder. The suspension was sealed and kept in 65° C. oven for 16 h and agitated occasionally. Then, the powder was washed with 1 L DI water for 3 times. For each wash, clean DI water was added and the suspension was vortexed for 30 seconds. Then the suspension was centrifuged at 1700 rpm for 2 min and the supernatant was removed. After the third wash, water was added to the sediment to make a $CrO_2$ water suspension. The suspension was filtered by a testing sieve with mesh size 20 μm to remove larger grains. Extra water was removed by vacuum drying to form dried stabilized $CrO_2$ powder. The powder was further fined by pestle and mortar and mixed with DI water to form a $CrO_2$/water suspension. The suspension was filtered by a testing sieve with mesh size 20 μm to remove larger grains. Extra water was removed by drying in a fume hood to form dried, stabilized $CrO_2$ powder. The powder was further processed by crushing it with a pestle and mortar.

Preparation of Magnetic Silk Film

The $CrO_2$/water suspension was sonicated for 20 min before added into 1 mL SF solution. The adding amount depends on the $CrO_2$:SF mass ratio and the concentration of the $CrO_2$ suspension and SF. The well mixed $CrO_2$/SF mixture was quickly poured onto a trichloro(1H,1H,2H,2H-perfluorooctyl) silane (FOTS) pretreated silicon wafer and dried in a close chamber (25° C., 30% relative humidity) overnight.

Preparation of Magnetic Silk Sponge

To make the magnetic silk sponge, an aluminum mold with dimension of 30×20×20 $mm^3$ was first placed in a −80° C. freezer for 30 min to pre-cool it. Then the well mixed $CrO_2$/SF solution was poured into the mold and stored in the freezer for 2 h until the liquid mixture was totally frozen. After freezing, the mixture was dried in the mold using a lyophilizer for 24 h to form a magnetic silk sponge. The faster the liquid mixture freezes, the less sedimentation of $CrO_2$ powder will occur, and a more uniformly distributed sponge can be obtained.

Preparation of Magnetic Silk Monolith

Solid fibroin-$CrO_2$ composite constructs were fabricated through an evaporative casting method. $CrO_2$ was added to 10% wt/vol fibroin solution and gently mixed until a homogeneous solution was made. A silicone sealed rectangular mold with 2 faces made of dialysis tubing and all other faces made of PMMA was then filled with the $CrO_2$/SF mixture and left to dry in a humidity-controlled chamber at 40% humidity and 29° C. Sol-gel transition and the following drying took about 4 days, resulting in a solid $CrO_2$/SF block. This block was then processed with a CNC mill and a belt sander to create designed solid form.

Preparation of Magnetic Silk Hydrogel

To make elastic enzymatically crossed silk hydrogel, 10 units of horse radish peroxide (HRP) (Sigma-Aldrich, USA) was added to per mL of $CrO_2$/SF solution with gentle stir. Then, 165 mM hydroperoxide aqueous solution was added by 1% vol/vol concentration, for a final concentration of 1.65 mM. The mixture was sealed for about 30 min to finish the crosslinking reaction.

Preparation of Magnetic Elastomers

For the preparation of poly(dimethylsiloxane) (PDMS) magnetic composites, a two-component reagent (Slygard® 184, Dow Corning Corp., USA) was used. First, the sieved and stabilized dry $CrO_2$ powder was added into the siloxane base with desired mass ratio. The mixture was then shear-mixed for 10 minutes and followed with a sonication with a high-power probe sonicator for 30 minutes. After that, the crosslinking agent was added into the mixture at a mass ratio of 10% relative to the combined weight of $CrO_2$ powder and siloxane base, followed by sufficiently mixing. After being poured into the mold, the mixture was degassed for 30 min under vacuum and then cured in an oven at 120° C. for 4 hours.

Calculation of Relaxation Time

The calculation of the thermal relaxation time τ is based on heat capacity. τ can be derived by:

$$\tau = \frac{\rho C b}{h},$$

Where ρ is the density, C is the heat capacity, b is the thickness of the sample and h is the heat conduction coefficient. With thinner samples, the temperature will rise faster with the same illumination power. ρ can be calculated by the mass ratio of $CrO_2$ to SF/PDMS, and the density of individual compound. h is calculated by:

$$2h\Delta TA = P_{laser},$$

where ΔT is the temperature rise associated to input light power $P_{laser}$. A is the surface area of the sample and C may be experimentally measured by using differential scanning calorimetry (DSC). The experimental values and calculated results are summarized in Table 2. Using the tabulated heat capacity for $CrO_2$, is estimated to be 0.672.

TABLE 2

Non-limiting example values used to calculate τ for 50% magnetic SF and 50% magnetic PDMS samples.

| sample | ρ ($g\ cm^{-3}$) | $C_{base}$ ($J\ kg\ K^{-1}$) | $C_{CrO_2}$ ($J\ kg\ K^{-1}$) | b (μm) | $P_{laser}$ (W) | h ($Wm^{-2}\ K^{-1}$) | $\tau_{exp}$ (s) | $\tau_{CrO_2}$ (s) | $\tau_{base}$ (s) |
|---|---|---|---|---|---|---|---|---|---|
| 50% SF_1 | 1.721 | 1518 | 810 | 36 | 0.037 | 44.09 | 1.024 | 1.124 | 2.133 |
| 50% SF_2 | | | | 32 | | 45.08 | 1.036 | 0.977 | 1.854 |

TABLE 2-continued

Non-limiting example values used to calculate τ for 50% magnetic SF and 50% magnetic PDMS samples.

| sample | ρ (g cm$^{-3}$) | $C_{base}$ (J kg K$^{-1}$) | $C_{CrO_2}$ (J kg K$^{-1}$) | b (μm) | $P_{laser}$ (W) | h (Wm$^{-2}$ K$^{-1}$) | $\tau_{exp}$ (s) | $\tau_{CrO_2}$ (s) | $\tau_{base}$ (s) |
|---|---|---|---|---|---|---|---|---|---|
| 50% SF_3 | | | | 29 | | 45.47 | 0.945 | 0.878 | 1.666 |
| 50% PDMS_1 | 1.318 | 2174 | | 115 | | 48.74 | 2.014 | 2.48 | 6.761 |
| 50% PDMS_2 | | | | 111 | | 45.21 | 3.131 | 2.59 | 7.035 |
| 50% PDMS_3 | | | | 105 | | 49.21 | 1.672 | 2.25 | 6.114 |
| P-value from paired two-tail t-test | | | | | | | 0.672 ($\tau_{exp}$ vs. $\tau_{CrO_2}$) | | |
| | | | | | | | 0.021 ($\tau_{exp}$ vs. $\tau_{base}$) | | |

Example Calculation of Photothermal-Conversion Efficiency

Similar methods for calculating the photothermal conversion efficiency have been reported in the literature, for example, Wang J et al. (2017) High-Performance Photothermal Conversion of Narrow-Bandgap Ti2O3 Nanoparticles. Adv. Mater. 29 and Yang H et al. (2017) 3D Printed Photoresponsive Devices Based on Shape Memory Composites. Adv. Mater. 29, where are incorporated herein by reference. Briefly, the photothermal conversion efficiency may be expressed as follows:

$$\eta = \frac{Q}{q}$$

where Q is thermal energy, and q is the incident optical energy. The generated heat Q raises the sample temperature to $T_{max}$ from environmental temperature $$T_{room}^{max}:$$

$$Q = UA(T_{max} - T_{room}^{max})$$

where U is the heat transfer coefficient, A is the sample surface area, and $$T_{room}^{max}$$

is the maximum air temperature surrounding the sample. Energy is lost with a rate constant defined as:

$$w = \frac{1}{\tau} = \frac{UA}{Cm}$$

One can fit the cooling curve with:

$$T(t) = (T_{max} - T_{room} - a)e^{(-wt)} + a \cdot e^{(-w_{surr}t)} + T_{room}$$

$$a = \frac{w}{w - w_{surr}}(T_{room}^{max} - \tau_{max})$$

where $w_{surr}$ is the rate constant of the air surrounding the sample, and $T_{room}$ is the air temperature surrounding the sample at t=0 (that is, room temperature), to obtain the value for w, $w_{surr}$ and $$T_{room}^{max}.$$

With known values for C and m, one can calculate the values for U and Q, and further estimate the photothermal conversion efficiency $\eta$.

Sample Illumination and Data Analysis

The samples were illuminated with a 532 nm continuous wave laser (Millennia Pro™, Spectra-Physics, USA). The collimated beam was unfocused by a 3 cm focal length lens to expand the beam diameter to 2 cm. The beam waist was measured by the knife-edge method. The total output power $P_{total}$ of the laser was measured by an optical power meter (PM100A, Thorlabs GmbH, Germany). The received power on sample surface from a Gaussian laser beam may be calculated by:

$$P_{laser} = (1 - R)\int_{-w/2}^{w/2}\int_{-l/2}^{l/2} I_o \exp\left(-\frac{2(x^2 + y^2)}{r^2}\right)dxdy$$

where R is the reflectance of the sample surface, r is the beam radius (r=20), $I_o$ is the intensity amplitude calculated by $I_o = 2P_{total}/\pi r^2$ for Gaussian beam profile, w and I are the sample width and length respectively.

The temperature profile of the sample was obtained by an infrared camera (SC645, FLIR® Systems, Inc., Sweden) at 50 cm distance. The temperature measured is the spatial maximum temperature across the whole sample, and is the average over a one minutes' period after the temperature is stabilized. At least three samples were measured and the mean value for each laser intensity was averaged from the total 3600 data points of three samples. The error bar is ±standard deviation of these 3600 temperature data.

Videos of actuators were taken with DSLR camera (Canon EOS rebel T1i) at 30 fps. For each frame, the cantilever edge image was detected by house made Matlab (The MathWorks, Inc., USA) algorithm and the tip position was recorded. The errors for displacement D was calculated by error propagation using standard deviation of Dx and $D_y$—the displacement in x and y directions respectively—plus the system sensitivity 20 μm/pixel.

Sample Characterizing

The SEM images were taken with Scanning Electron Microscopy (Supra 55VP, Carl Zeiss AG, Germany) at 3 kV. The magnetization measurements were done with a Vibrating Sampling Magnetometer (Physical Property Measurement System, Quantum Design, Inc., USA) at National High Magnetic Field Laboratory, Los Alamos, USA. During the magnetization vs field (M~H) and magnetization vs temperature (M~T) measurements, the magnetic field was applied parallel to the composite film plane. The M~H loops were measured at 300 K and 350 K for (24.7±0.3) mg non-treated $CrO_2$ and (48.2±0.3) mg pretreated $CrO_2$ powder, respectively. During the M-T measurements, a magnetic field of 0.5 kOe was applied and magnetic data was recorded during cooling from 400 K to 200 K. The infrared spectrum of absorption was carried out using a spectrometer (FT/IR-6200, JASCO, Inc., USA), equipped with a multiple reflection, horizontal attachment with Ge ATR crystal (MIRacle™, Pike Technologies, USA). All the FTIR spectra were collected in the range of 4000-600 $cm^{-1}$ at resolution of 4 $cm^{-1}$ with an average of 32 scans. The thermal degradation was analysis with a thermogravimetric analyzer (Q500, TA Instruments, USA) was performed at heating rate 20° C./min. Specific heat capacity was measured with differential scanning calorimeter (Q100, TA Instruments, USA) at heating/cooling rate 20° C./min. The tensile stress-strain data were measured with a Dynamic Mechanical Analyzer (RSA3, TA instruments, USA) under static strain rate 1%/min. The thickness of the tensile sample was measured at three different spots by a digital micrometer and averaged.

The present disclosure has described one or more preferred embodiments, and it should be appreciated that many equivalents, alternatives, variations, and modifications, aside from those expressly stated, are possible and within the scope of the invention.

In addition to the features described above and elsewhere herein, the present disclosure also includes the following clauses:

1. A temperature-responsive flexible magnetic composite comprising: a composite material comprising at least one polymer and a plurality of magnetic particles dispersed throughout at least a portion of the composite material, wherein the polymer is silk fibroin or poly (dimethylsiloxane), and wherein the plurality of magnetic particles comprises a Curie temperature above which the plurality of magnetic particles becomes paramagnetic and loses spontaneous magnetization.
2. The temperature-responsive flexible magnetic composite according to any one of the preceding clauses, wherein the magnetic particle comprises a Curie temperature of less than 300° C.
3. The temperature-responsive flexible magnetic composite according to any one of the preceding clauses, wherein the magnetic particle comprises chromium dioxide ($CrO_2$).
4. The temperature-responsive flexible magnetic composite according to any one of the preceding clauses, wherein the magnetic particle is dispersed uniformly throughout at least a portion of the composite material.
5. The temperature-responsive flexible magnetic composite according to any one of the preceding clauses, wherein the magnetic particle is dispersed at a gradient concentration, wherein the concentration of magnetic particle is greater at a first location in the composite material when compared to a second location.
6. The temperature-responsive flexible magnetic composite according to any one of the preceding clauses, wherein the polymer and the plurality of magnetic particles are formed into a material selected from a film, a sponge, a monolith, and a hydrogel.
7. The temperature-responsive flexible magnetic composite of clause 6, wherein the hydrogel material comprises crosslinked silk fibroin and the plurality of magnetic particles dispersed throughout the crosslinked silk fibroin.
8. The temperature-responsive flexible magnetic composite according to any one of the preceding clauses, wherein the flexible composite material comprises a weight ratio of magnetic particle to polymer between 1:1 and 5:1.
9. The temperature-responsive flexible magnetic composite according to any one of the preceding clauses, wherein the composite material of clause 1 further comprises an additive.
10. The temperature-responsive flexible magnetic composite of clause 9, wherein the additive is a light absorbing additive.
11. The temperature-responsive flexible magnetic composite of clause 9, wherein the additive increases the thermal conductivity of the composite material.
12. The temperature-responsive flexible magnetic composite according to any one of the preceding clauses, wherein the composite material is formed into an actuator, wherein at least a portion of the actuator is configured to move in response to the Curie temperature and a magnetic field.
13. The temperature-responsive flexible magnetic composite according to any one of the preceding clauses, wherein the composite material is formed in the shape of a grapple actuator, wherein the grapple actuator comprises one or more opposing lever configured to pinch and retract in response to a portion of the grapple actuator reaching the Curie temperature and a magnetic field.
14. The temperature-responsive flexible magnetic composite according to any one of the preceding clauses, wherein the composite material is formed in the shape of a wheel, wherein the wheel is configured to rotate in response to a portion of the wheel reaching the Curie temperature and a magnetic field.
15. A thermal-sensitive actuator system comprising: an actuator composed of a composite material, the composite material comprising at least one polymer and a plurality of magnetic particles dispersed throughout at least a portion of the composite material, wherein the plurality of magnetic particles has a Curie temperature above which the plurality of magnetic particles becomes paramagnetic and loses spontaneous magnetization; a magnet configured to apply a magnetic field over at least a portion of the actuator; and a heating system configured to apply heat at least a portion of the actuator.
16. The thermal-sensitive actuator system of clause 15, wherein the heating system is configured to apply heat to at least a portion of the actuator for a duration sufficient such that the actuator moves in response to the magnetic field and at least a portion of the magnetic particles in the actuator reaching the Curie temperature.

17. The thermal-sensitive actuator system of clause 15 or 16, wherein the actuator is in the shape of a wheel, and the heating system is configured to apply heat to at least a portion of the wheel such that the wheel rotates in response to the magnetic field and at least a portion of the magnetic particles reaching the Curie temperature.

18. The thermal-sensitive actuator system of any one of clauses 15 to 17, wherein the actuator is in the shape of a grapple having one or more opposing lever configured to pinch and retract, and the heating system is configured to apply heat to at least a portion of the grapple such that the grapple pinches and retracts in response to the magnetic field and at least a portion of the magnetic particles reaching the Curie temperature.

19. The thermal-sensitive actuator system of any one of clauses 15 to 18, wherein the polymer is selected from silk fibroin and poly(dimethylsiloxane).

20. The thermal-sensitive actuator system of any one of clauses 15 to 19, wherein the magnet comprises a permanent magnet or an electromagnet.

21. The thermal-sensitive actuator system of any one of clauses 15 to 20, wherein the heating system comprises a light source configured to irradiate the portion of the actuator.

22. The thermal-sensitive actuator system of any one of clauses 15 to 21, wherein the light source comprises a laser.

23. A method of using a flexible composite material as an actuator, the method comprising:

heating a composite material to a temperature sufficient to raise the temperature of at least a portion of the composite material above a Curie temperature of one or more magnetic particles in the composite material, wherein the composite material comprises at least one polymer and the one or more magnetic particles dispersed throughout at least a portion of the composite material, wherein the polymer is silk fibroin or poly (dimethylsiloxane), and wherein the plurality of magnetic particles comprises a Curie temperature above which the plurality of magnetic particles becomes paramagnetic and loses spontaneous magnetization.

24. The method of clause 23, wherein the heating is remote.

25. The method of clause 23 or 24, wherein the heating includes illuminating the composite material with light in an amount sufficient to raise the temperature above the Curie temperature of the one or more magnetic particles in the composite material.

26. The method of any one of clauses 23 to 25, wherein the composite material comprises the composite material of any one of clauses 2 to 14.

27. A method of making a flexible magnetic composite material, the steps comprising: casting a layer of a material comprising at least one polymer and a plurality of magnetic particles; and forming the material into an actuator, wherein the polymer is silk fibroin or poly(dimethylsiloxane), and wherein the plurality of magnetic particles comprises a Curie temperature above which the plurality of magnetic particles becomes paramagnetic and loses spontaneous magnetization.

We claim:

1. A temperature-responsive flexible magnetic composite comprising:

a composite material comprising at least one polymer and a plurality of magnetic particles dispersed throughout at least a portion of the composite material, the composite material further comprising a light-absorbing additive, wherein the at least one polymer is silk fibroin or poly (dimethylsiloxane), wherein the plurality of magnetic particles comprises a Curie temperature above which the plurality of magnetic particles becomes paramagnetic and loses spontaneous magnetization, wherein the Curie temperature is less than 300° C., wherein irradiating the light-absorbing additive elevates a temperature of at least a portion of the composite material above the Curie temperature, thereby reducing or eliminating spontaneous magnetization in the at least a portion of the composite material, and wherein the light-absorbing additive is a dye molecule.

2. The temperature-responsive flexible magnetic composite of claim 1, wherein the plurality of magnetic particles comprises chromium dioxide ($CrO_2$).

3. The temperature-responsive flexible magnetic composite of claim 1, wherein the plurality of magnetic particles are dispersed uniformly throughout at least a portion of the composite material.

4. The temperature-responsive flexible magnetic composite of claim 1, wherein the plurality of magnetic particles are dispersed at a gradient concentration, wherein the gradient concentration of plurality of magnetic particles is greater at a first location in the composite material when compared to a second location.

5. The temperature-responsive flexible magnetic composite of claim 1, wherein the at least one polymer and the plurality of magnetic particles are formed into a material selected from a film, a sponge, a monolith, and a hydrogel.

6. The temperature-responsive flexible magnetic composite of claim 5, wherein the hydrogel comprises crosslinked silk fibroin and the plurality of magnetic particles dispersed throughout the crosslinked silk fibroin.

7. The temperature-responsive flexible magnetic composite of claim 1, wherein the composite material comprises a weight ratio of magnetic particle to polymer between 1:1 and 5:1.

8. The temperature-responsive flexible magnetic composite of claim 1, wherein interplay between the plurality of magnetic particles and the light-absorbing additive in a presence of an external magnetic field produces micro- or macro-scale motion.

9. The temperature-responsive flexible magnetic composite of claim 1, wherein the composite material further comprises a thermal additive that increases a thermal conductivity of the composite material.

10. The temperature-responsive flexible magnetic composite of claim 1, wherein the composite material is formed into an actuator, wherein at least a portion of the actuator is configured to move in response to the Curie temperature and a magnetic field.

11. The temperature-responsive flexible magnetic composite of claim 1, wherein the composite material is formed in a shape of a grapple actuator, wherein the grapple actuator comprises one or more opposing lever configured to pinch and retract in response to a portion of the grapple actuator reaching the Curie temperature and a magnetic field.

12. The temperature-responsive flexible magnetic composite of claim 1, wherein the composite material is formed in a shape of a wheel, wherein the wheel is configured to rotate in response to a portion of the wheel reaching the Curie temperature and a magnetic field.

13. A temperature-responsive flexible magnetic composite comprising:

a composite material comprising at least one polymer and a plurality of magnetic particles dispersed throughout at least a portion of the composite material, the composite material further comprising a light-absorbing additive, wherein the at least one polymer is silk fibroin or poly (dimethylsiloxane), wherein the plurality of magnetic particles comprises a Curie temperature above which the plurality of magnetic particles becomes paramagnetic and loses spontaneous magnetization, wherein the Curie temperature is less than 300° C., wherein irradiating the light-absorbing additive elevates a temperature of at least a portion of the composite material above the Curie temperature, thereby reducing or eliminating spontaneous magnetization in the at least a portion of the composite material, and wherein the at least one polymer and the plurality of magnetic particles are formed into a material selected from a film, a sponge, a monolith, and a hydrogel.

14. A temperature-responsive flexible magnetic composite comprising:

a composite material comprising at least one polymer and a plurality of magnetic particles dispersed throughout at least a portion of the composite material, the composite material further comprising a light-absorbing additive, wherein the at least one polymer is silk fibroin or poly (dimethylsiloxane), wherein the plurality of magnetic particles comprises a Curie temperature above which the plurality of magnetic particles becomes paramagnetic and loses spontaneous magnetization, wherein the Curie temperature is less than 300° C., wherein irradiating the light-absorbing additive elevates a temperature of at least a portion of the composite material above the Curie temperature, thereby reducing or eliminating spontaneous magnetization in the at least a portion of the composite material, and wherein the composite material comprises a weight ratio of magnetic particle to polymer between 1:1 and 5:1.

* * * * *